United States Patent
Cates

(10) Patent No.: US 11,200,151 B1
(45) Date of Patent: Dec. 14, 2021

(54) GRAPHICAL USER INTERFACE AND DEBUGGER SYSTEM FOR SELECTING AND TESTING ALTERATIONS TO SOURCE CODE FOR SOFTWARE APPLICATIONS

(71) Applicant: SAS Institute Inc., Cary, NC (US)

(72) Inventor: Claire Smith Cates, Carolina Beach, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 17/458,881

(22) Filed: Aug. 27, 2021

Related U.S. Application Data

(60) Provisional application No. 63/160,221, filed on Mar. 12, 2021, provisional application No. 63/185,998, filed on May 7, 2021.

(51) Int. Cl.
*G06F 11/36* (2006.01)

(52) U.S. Cl.
CPC ...... *G06F 11/3664* (2013.01); *G06F 11/3624* (2013.01); *G06F 11/3676* (2013.01); *G06F 11/3688* (2013.01)

(58) Field of Classification Search
CPC .. G06F 11/36; G06F 11/3664; G06F 11/3679; G06F 11/3688
See application file for complete search history.

(56) References Cited

U.S. PATENT DOCUMENTS

| | | |
|---|---|---|
| 4,910,663 A | 3/1990 | Bailey |
| 5,050,168 A | 9/1991 | Paterson |
| 7,401,322 B1 | 7/2008 | Shagam et al. |

(Continued)

FOREIGN PATENT DOCUMENTS

| | | |
|---|---|---|
| EP | 2420931 B1 | 11/2017 |
| EP | 1696316 B1 | 8/2019 |

OTHER PUBLICATIONS

Zhong Xi Lu et al., Semi-automatic Test Case Expansion for Mutation Testing, 2020, IEEE, retrieved online on Oct. 27, 2021, pp. 1-7. Retrieved from the Internet: <URL: https://ieeexplore.ieee.org/stamp/stamp.jsp?tp=&arnumber=9051637>. (Year: 2020).*

(Continued)

*Primary Examiner* — Hanh Thi-Minh Bui
(74) *Attorney, Agent, or Firm* — Kilpatrick Townsend & Stockton LLP

(57) ABSTRACT

Testing for software applications can be implemented according to some aspects described herein. For example, a system can receive override data, including a location of a logical statement in source code and an override command, that is associated with a software application. The system can generate debugging data based on the override data, the debugging data including a breakpoint associated with the location and a debugger command corresponding to the override command. The system can then provide the debugging data as input to debugging software, the debugging software being configured to monitor execution of the software application during a software test. The debugging software can determine that the breakpoint has been reached and responsively execute the debugger command for testing a target portion of source code for the software application.

27 Claims, 16 Drawing Sheets

(56) References Cited

U.S. PATENT DOCUMENTS

| | | |
|---|---|---|
| 7,584,455 B2 | 9/2009 | Ball |
| 8,166,463 B2 | 4/2012 | Gill et al. |
| 8,453,115 B2 | 5/2013 | Murray et al. |
| 8,954,926 B2 | 2/2015 | Braun et al. |
| 9,390,260 B2 | 7/2016 | Tan et al. |
| 9,529,699 B2 | 12/2016 | Rajan et al. |
| 9,569,342 B2 | 2/2017 | Bijanki et al. |
| 9,645,912 B2 | 5/2017 | Dubinsky et al. |
| 9,658,947 B2 | 5/2017 | Wei et al. |
| 9,720,814 B2 | 8/2017 | Boia et al. |
| 9,734,045 B2 | 8/2017 | Sathyamurthy et al. |
| 9,916,235 B2 | 3/2018 | Magill et al. |
| 10,037,266 B2 | 7/2018 | Allison et al. |
| 10,049,032 B2 | 8/2018 | Pasala et al. |
| 10,089,218 B2 | 10/2018 | Lopian |
| 10,169,212 B2 | 1/2019 | Fulton et al. |
| 10,261,891 B2 | 4/2019 | Rajagopalan et al. |
| 10,394,694 B2 | 8/2019 | Phan et al. |
| 10,438,111 B2 | 10/2019 | Iscoe et al. |
| 10,452,526 B2 | 10/2019 | Rajpal et al. |
| 10,489,279 B2 | 11/2019 | Rajagopalan et al. |
| 10,635,576 B2 | 4/2020 | Phan et al. |
| 10,642,722 B2 | 5/2020 | Li et al. |
| 10,642,726 B2 | 5/2020 | Abhishek |
| 10,698,789 B1 | 6/2020 | Liu et al. |
| 10,698,804 B1 | 6/2020 | Bauman et al. |
| 10,705,949 B2 | 7/2020 | Krishnan et al. |
| 10,713,151 B1 | 7/2020 | Zinger et al. |
| 10,783,056 B2 | 9/2020 | Raviv et al. |
| 10,795,799 B2 | 10/2020 | Lipka et al. |
| 10,795,801 B2 | 10/2020 | Raviv et al. |
| 10,817,408 B2 | 10/2020 | Sathyamurthy et al. |
| 10,949,172 B1 | 3/2021 | Jain et al. |
| 2007/0168975 A1 | 7/2007 | Kessler |
| 2012/0167057 A1 | 6/2012 | Schmich et al. |
| 2017/0132121 A1 | 5/2017 | Cooper et al. |
| 2019/0138433 A1* | 5/2019 | Krishnan ............ G06F 11/3688 |

OTHER PUBLICATIONS

"Mutation Testing", Wikipedia, Available Online at https://en.wikipedia.org/wiki/Mutation_testing, Accessed from Internet on Mar. 30, 2021, pp. 1-6.

"Mutation Testing in Software Testing: Mutant Score & Analysis Example", Guru99, Available Online at https://www.guru99.com/mutation-testing.html, 2021, 9 pages.

Bieman et al., "Using Fault Injection to Increase Software Test Coverage", Proceedings of the The Seventh International Symposium on Software Reliability Engineering, Oct. 30, 1996, pp. 1-9.

Hariri et al., "SRCIROR: A Toolset for Mutation Testing of C Source Code and LLVM Intermediate Representation", The 33rd ACM/IEEE International Conference, Sep. 3, 2018, pp. 860-863.

Nguyen et al., "Problems of Mutation Testing and Higher Order Mutation Testing", Advances in Intelligent Systems and Computing, vol. 282, Jan. 2014, pp. 1-15.

Papadakis et al., "Using Mutants to Locate "Unknown" Faults", 2012 IEEE Fifth International Conference on Software Testing, Verification and Validation, 2012, pp. 691-700.

Rani et al., "Experimental Comparison of Automated Mutation Testing Tools for Java", 4th International Conference on Reliability, Infocom Technologies and Optimization (ICRITO), Sep. 2015, 6 pages.

* cited by examiner

FIG. 14

```
override_file.xml

<fname> file_name </fname>
<timestamp> timeStamp </timestamp>
<image> xxx </image>
<skip> startSkip endSkip </skip>
<globals>
Globalvar1
globalvar2
</globals>
<define> xxxx </define>
<routine> function_name </routine>
<rline> lineNumber </rline>
<params>
Param1
Param2
...
</params>
<vars>
Localvar1
Localvar2
...
</vars>
<labels>
LineNumber labelName1
labelName2
</labels>
<if>
    <line> 1509 </line>
    <nlines> 3 </nlines>
    <else> 0 </else>
    <level> 4 </level>
    <parent> 1506 </parent>
    <ncmds> 1 </ncmds>
    <src>
    if (status) {
        LogDebug(actx->logger, 0, TKTEXT("%d send=0x%x"), i, status);
    notified++; }
    </src>
    <cmds>
    status=1
    </cmds>
</if>
```

1500 — override_file.xml
1502 → `<if>`
1504 → `<line>`
1506 → `<cmds>`

FIG. 15

GRAPHICAL USER INTERFACE AND DEBUGGER SYSTEM FOR SELECTING AND TESTING ALTERATIONS TO SOURCE CODE FOR SOFTWARE APPLICATIONS

REFERENCE TO RELATED APPLICATIONS

This application claims the benefit of priority under 35 U.S.C. § 119(e) to U.S. Provisional Patent Application No. 63/160,221, filed Mar. 12, 2021, and U.S. Provisional Patent Application No. 63/185,998, filed May 7, 2021, the entirety of each of which is hereby incorporated by reference herein.

TECHNICAL FIELD

The present disclosure relates generally to software testing of software applications. More specifically, but not by way of limitation, this disclosure relates to a graphical user interface and debugger system for selecting and testing alterations to source code for software applications.

BACKGROUND

Software testing can involve executing a software application to see how it works under certain testing conditions initiated by a software test. The software application can be defined by source code including logical statements, functions, and local and global variables. The source code can be compiled into an executable file that can be tested by the software test to produce functional results. The software test can work with debugging software for outputting and recording one or more results of the code execution.

One type of software testing is alteration testing, such as mutation testing. Mutation testing may involve changing the source code for a software application to alter one or more statements in the source code. These alterations can be referred to as "mutations." The resulting source code, as modified with the mutations, can be referred to as a "mutant" of the original source code. In a typical testing scenario, a user may manually create a large number of mutants of the original source code for a software application. Each mutant may be designed to force the software test to inspect a particular code branch that it may not otherwise inspect absent the mutation. Once generated, each mutant can then be compiled into an executable file for testing. The software test can then be run on each of the executable files corresponding to the mutants for testing the different code branches. Since the software test may be unable to inspect every code branch of the software application without these mutations, mutation testing can force testing on certain code branches to achieve a greater level of overall test coverage than may otherwise be possible.

SUMMARY

One example of the present disclosure includes a system having one or more processors and a memory device comprising instructions that are executable by the one or more processors for causing the one or more processors to perform operations. The operations can include receiving override data that is separate from and associated with source code for a software application, the override data including a location of a logical statement in the source code and the override data including an override command for execution upon reaching the location during a software test of the software application, and the override command being configured to cause debugging software to modify an execution path of the software application during the software test from a first code pathway that excludes a target portion of the source code to a second code pathway that includes the target portion of the source code. The operations can include generating debugging data based on the override data, the debugging data including a breakpoint associated with the location, the debugging data including a debugger command corresponding to the override command, and the debugging data having a format that is different from the override data for compatibility with the debugging software. The operations can include providing the debugging data as input to the debugging software, the debugging software being configured to monitor execution of the software application during the software test and responsively: determine that the breakpoint has been reached; in response to determining that the breakpoint has been reached, execute the debugger command for testing the target portion of the source code; and store, in a log, a test result from testing the target portion of the source code.

Another example of the present disclosure can include a method. The method can include receiving override data that is separate from and associated with source code for a software application, the override data including a location of a logical statement in the source code and the override data including an override command for execution upon reaching the location during a software test of the software application, and the override command being configured to cause debugging software to modify an execution path of the software application during the software test from a first code pathway that excludes a target portion of the source code to a second code pathway that includes the target portion of the source code. The method can include generating debugging data based on the override data, the debugging data including a breakpoint associated with the location, the debugging data including a debugger command corresponding to the override command, and the debugging data having a format that is different from the override data for compatibility with the debugging software. The method can include providing the debugging data as input to the debugging software, the debugging software being configured to monitor execution of the software application during the software test and responsively: determine that the breakpoint has been reached; in response to determining that the breakpoint has been reached, execute the debugger command for testing the target portion of the source code; and store, in a log, a test result from testing the target portion of the source code. Some or all of the method steps can be implemented by a processor.

Yet another example of the present disclosure can include a non-transitory computer-readable medium comprising program code that is executable by a processor for causing the processor to perform operations. The operations can include receiving override data that is separate from and associated with source code for a software application, the override data including a location of a logical statement in the source code and the override data including an override command for execution upon reaching the location during a software test of the software application, and the override command being configured to cause debugging software to modify an execution path of the software application during the software test from a first code pathway that excludes a target portion of the source code to a second code pathway that includes the target portion of the source code. The operations can include generating debugging data based on the override data, the debugging data including a breakpoint associated with the location, the debugging data including a debugger command corresponding to the override command, and the debugging data having a format that is different from the override data for compatibility with the debugging software. The operations can include providing the debugging data as input to the debugging software, the debugging software being configured to monitor execution of the software application during the software test and responsively: determine that the breakpoint has been reached; in response to determining that the breakpoint has been reached, execute the debugger command for testing the target portion of the source code; and store, in a log, a test result from testing the target portion of the source code.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures:

FIG. 14 depicts an example of a graphical user interface for generating override data according to some aspects.

FIG. 15 depicts an example of an override file for testing a software application according to some aspects.

Figure 1:
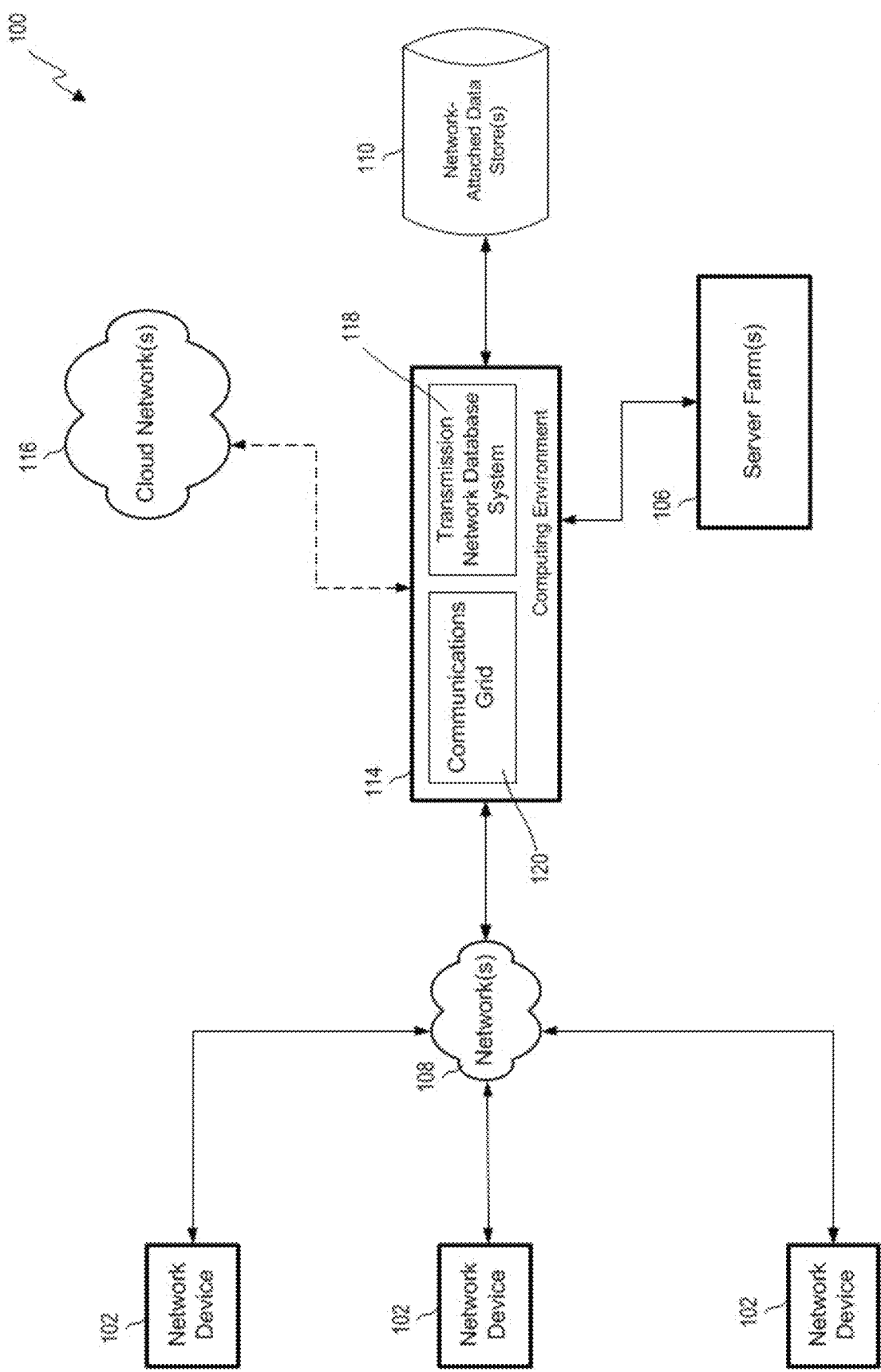
FIG. 1 depicts a block diagram of an example of a computing system according to some aspects.

In the appended figures, similar components or features can have the same reference label. Further, various components of the same type can be distinguished by following the reference label with a lowercase letter that distinguishes among the similar components. If only the first reference label is used in the specification, the description is applicable to any one of the similar components having the same first reference label irrespective of the lowercase letter.

DETAILED DESCRIPTION

One common type of software testing is alteration testing, such as mutation testing. Mutation testing can involve generating multiple mutants of source code for a software application and compiling the mutants for individualized testing. Since software tests may fail to test edge cases given the difficulty of creating tests that cover all possible conditions, mutation testing can allow for such edge cases to be tested, thereby improving overall test coverage of the software application. But conventional alteration testing can also have disadvantages. For example, generating mutants is typically a manual task that is time consuming, tedious, and error prone. Also, generating and compiling mutants can consume a significant amount of computing resources (e.g., memory and processing power), particularly when there is a large number of mutants.

Some examples of the present disclosure can overcome one or more of the above-mentioned problems through a system configured to allow a user to quickly and easily select and test alterations to (e.g., mutations of) source code without having to recompile the source code, which can improve code coverage and reduce consumption of computing resources. More specifically, the system can include a graphical user interface (GUI) through which a user can quickly and easily input one or more alterations (e.g., mutations) to be applied to source code. The alterations can be configured to force a software test to test target code pathways in the source code. The GUI can then save information about the alterations as override data. The system can convert the override data into debugger data for use by debugging software, where debugging data includes breakpoints and debugger commands associated with the alterations. The debugging software can execute the debugger commands at the breakpoints so as to implement each alteration during one or more runs of a software test, thereby allowing the target code pathways to be tested during one or more iterations of the software test. The system may also log the results of the alteration tests. In this way, the system can implement and test alterations (e.g., on-the-fly) without multiple independent versions of the source code being pre-generated and compiled, thereby reducing consumption of computing resources. The system may also collect new test coverage data to be merged with existing test coverage data, thereby providing more-comprehensive test coverage results.

As a particular example, a user may wish to test a target execution pathway in source code for a software application. To do this, the user can operate a system that includes an alteration editor. The alteration editor that can include a GUI through which the user can add override commands to specific lines of the source code. The specific lines of the source code can be the portions of the source code that are to be altered (e.g., mutated) to reach one or more target code execution pathways that the user wants to test. Each override command can be a command configured to implement a corresponding alteration upon the corresponding line of the source code being reached during a software test. Using the GUI, the user can assign one or more override commands to a particular line of the source code associated with the target execution pathway. The override commands can be configured to cause one or more target execution pathways to be tested during the software test. The override commands and their corresponding code line can then be stored as override data by the GUI. The override command and the override data can be referred to as such because they may be used to override the default flow of the software test, for example by forcing the software test to traverse one or more target execution pathways in the source code that may not otherwise be traversed by the software test.

After the override data is generated, the system can generate debugging data based on the override data. For example, the system can include a breakpoint in the debugging data, where the breakpoint corresponds to the particular line of the source code selected by the user. The system can also include debugger commands in the debugging data, where the debugger commands are configured to implement the functionality of the override commands selected by the user. The debugger commands may be the same as or different from the override commands. Either way, the debugging data can include a breakpoint corresponding to the selected code line and the debugger commands corresponding to the selected override commands.

Next, the system can run the software test on the target software application. During the software test, the debugger can monitor execution of the software application. As the software test executes, the breakpoint described in the debugging data may ultimately be reached (e.g., assuming the software test is configured to encounter the line in the code corresponding to the breakpoint). Upon the breakpoint being reached, the debugger can select and execute a corresponding debugger command for causing a target execution pathway of the source code to be traversed. The software test can be run multiple times and the debugger can repeat the above process for each debugger command that is assigned to the breakpoint, to test multiple target execution pathways. In this way, the debugger can implement one or more alterations so that one or more target execution pathways can be tested, without the source code having to be pre-modified and recompiled each time.

As alluded to above, the GUI can enable the user to add multiple override commands to a single line of the source code or to multiple lines of the source code. These source code lines and override commands can be saved as override data, which can then be converted into debugging data for use by the debugger. The override data and the debugging data may each span one file or multiple files. The software test can then be separately run for each debugger command in the debugging data, so that the target execution pathway associated with each debugger command is tested. For example, the software test can be iterated for each debugging-data file, where each file is configured to implement a different debugger command to test a different target execution pathway. A final output file can contain debugger results pertinent to each iteration. The results of the software tests can then be summarized and reported for the user.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIGS. 1-12 depict examples of systems and methods usable for testing a software application according to some aspects. For example, FIG. 1 is a block diagram of an example of the hardware components of a computing system according to some aspects. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. The computing environment 114 may include one or more other systems. For example, computing environment 114 may include a database system 118 or a communications grid 120. The computing environment 114 can include one or more processing devices (e.g., distributed over one or more networks or otherwise in communication with one another) that may be collectively be referred to herein as a processor or a processing device.

Data transmission network 100 also includes one or more network devices 102. Network devices 102 may include client devices that can communicate with computing environment 114. For example, network devices 102 may send data to the computing environment 114 to be processed, may send communications to the computing environment 114 to control different aspects of the computing environment or the data it is processing, among other reasons. Network devices 102 may interact with the computing environment 114 through a number of ways, such as, for example, over one or more networks 108.

In some examples, network devices 102 may provide a large amount of data, either all at once or streaming over a period of time (e.g., using event stream processing (ESP)), to the computing environment 114 via networks 108. For example, the network devices 102 can transmit electronic messages for use in testing a software application, all at once or streaming over a period of time, to the computing environment 114 via networks 108.

The network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices 102 themselves. Network devices 102 may also include sensors that monitor their environment or other devices to collect data regarding that environment or those devices, and such network devices 102 may provide data they collect over time. Network devices 102 may also include devices within the internet of things, such as devices within a home automation network. Some of these devices may be referred to as edge devices, and may involve edge-computing circuitry. Data may be transmitted by network devices 102 directly to computing environment 114 or to network-attached data stores, such as network-attached data stores 110 for storage so that the data may be retrieved later by the computing environment 114 or other portions of data transmission network 100. For example, the network devices 102 can transmit data usable for testing a software application to a network-attached data store 110 for storage. The computing environment 114 may later retrieve the data from the network-attached data store 110 and use the data to test a software application.

Network-attached data stores 110 can store data to be processed by the computing environment 114 as well as any intermediate or final data generated by the computing system in non-volatile memory. But in certain examples, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated dynamically (e.g., on the fly). In this situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data stores may include storage other than primary storage located within computing environment 114 that is directly accessible by processors located therein. Network-attached data stores may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic communications. Examples of a non-transitory medium may include, for example, a magnetic disk or tape, optical storage media such as compact disk or digital versatile disk, flash memory, memory or memory devices. A computer-program product may include code or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data.

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time-stamped data may be aggregated by time (e.g., into daily time period units) to generate time series data or structured hierarchically according to one or more dimensions (e.g., parameters, attributes, or variables). For example, data may be stored in a hierarchical data structure, such as a relational online analytical processing (ROLAP) or multidimensional online analytical processing (MOLAP) database, or may be stored in another tabular form, such as in a flat-hierarchy form.

Data transmission network 100 may also include one or more server farms 106. Computing environment 114 may route select communications or data to the sever farms 106 or one or more servers within the server farms 106. Server farms 106 can be configured to provide information in a predetermined manner. For example, server farms 106 may access data to transmit in response to a communication. Server farms 106 may be separately housed from each other device within data transmission network 100, such as computing environment 114, or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more websites, sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain examples, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network 116 can dynamically scale to meet the needs of its users. The cloud network 116 may include one or more computers, servers, or systems. In some examples, the computers, servers, or systems that make up the cloud network 116 are different from the user's own on-premises computers, servers, or systems. For example, the cloud network 116 may host an application, and a user may, via a communication network such as the Internet, order and use the application on demand. In some examples, the cloud network 116 may host an application for testing a software application.

While each device, server, and system in FIG. 1 is shown as a single device, multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between server farms 106 and computing environment 114, or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired or wireless networks may be implemented using routers, access points, bridges, gateways, or the like, to connect devices in the network 108. The networks 108 can be incorporated entirely within or can include an intranet, an extranet, or a combination thereof. In one example, communications between two or more systems or devices can be achieved by a secure communications protocol, such as secure sockets layer (SSL) or transport layer security (TLS). In addition, data or transactional details may be encrypted.

Some aspects may utilize the Internet of Things (IoT), where things (e.g., machines, devices, phones, sensors) can be connected to networks and the data from these things can be collected and processed within the things or external to the things. For example, the IoT can include sensors in many different devices, and high value analytics can be applied to identify hidden relationships and drive increased efficiencies. This can apply to both big data analytics and real-time (e.g., ESP) analytics.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The computing nodes in the communications grid 120 and the transmission network database system 118 may share the same processor hardware, such as processors that are located within computing environment 114.

In some examples, the computing environment 114, a network device 102, or both can implement one or more processes for testing a software application. For example, the computing environment 114, a network device 102, or both can implement one or more versions of the processes discussed with respect to any of the figures.

Figure 2:
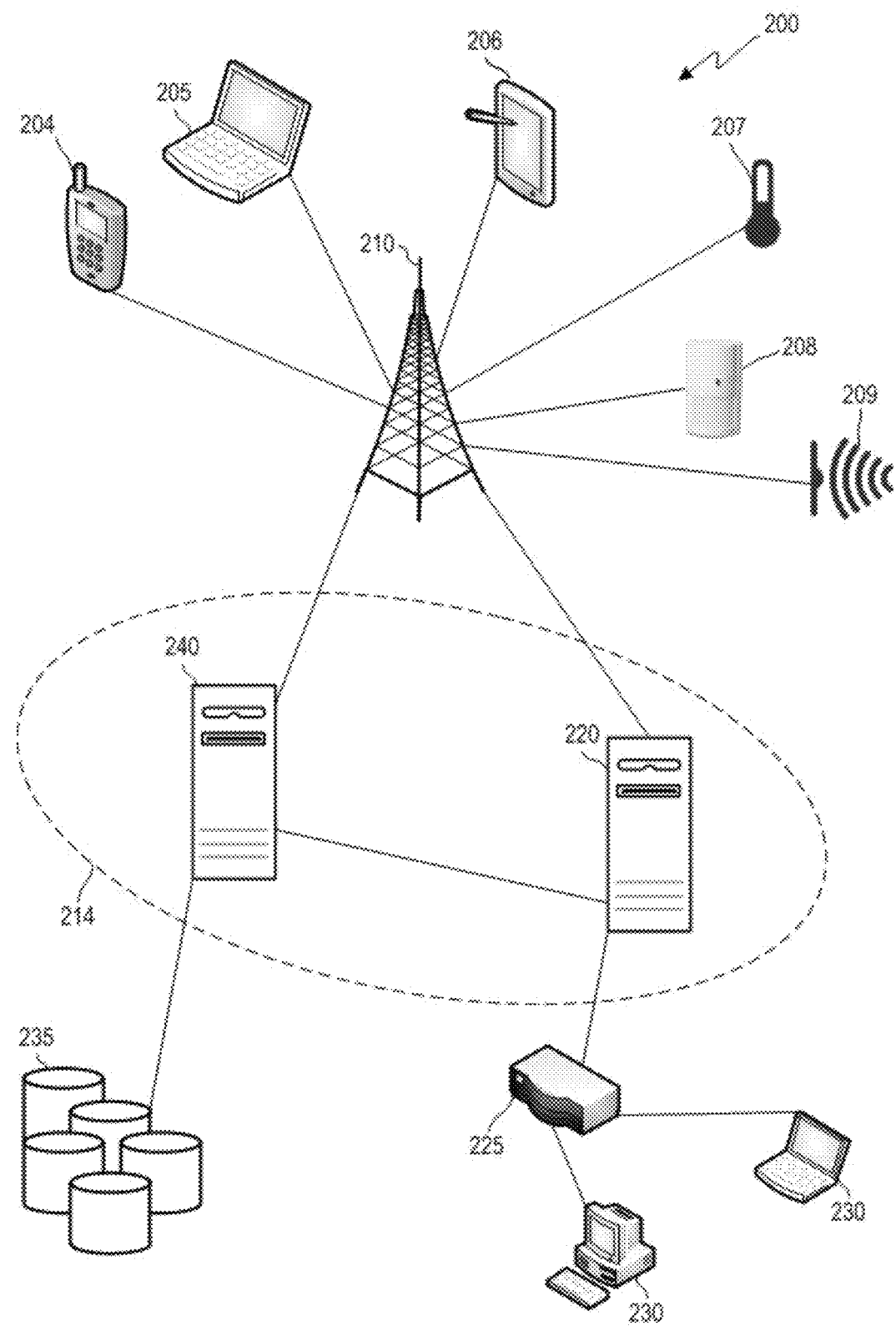
FIG. 2 depicts an example of devices that can communicate with each other over an exchange system and via a network according to some aspects.

FIG. 2 is an example of devices that can communicate with each other over an exchange system and via a network according to some aspects. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). In some examples, the communication can include times series data. The communication can be routed to another network device, such as network devices 205-209, via base station 210. The communication can also be routed to computing environment 214 via base station 210. In some examples, the network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems. The network devices may detect and record data related to the environment that it monitors, and transmit that data to computing environment 214.

The network devices 204-209 may also perform processing on data it collects before transmitting the data to the computing environment 214, or before deciding whether to transmit data to the computing environment 214. For example, network devices 204-209 may determine whether data collected meets certain rules, for example by comparing data or values calculated from the data and comparing that data to one or more thresholds. The network devices 204-209 may use this data or comparisons to determine if the data is to be transmitted to the computing environment 214 for further use or processing. In some examples, the network devices 204-209 can pre-process the data prior to transmitting the data to the computing environment 214. For example, the network devices 204-209 can reformat the data before transmitting the data to the computing environment 214 for further processing.

Computing environment 214 may include machines 220, 240. Although computing environment 214 is shown in FIG. 2 as having two machines 220, 240, computing environment 214 may have only one machine or may have more than two machines. The machines 220, 240 that make up computing environment 214 may include specialized computers, servers, or other machines that are configured to individually or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze or store data from or pertaining to communications, client device operations, client rules, or user-associated actions stored at one or more data stores 235. Such data may influence communication routing to the devices within computing environment 214, how data is stored or processed within computing environment 214, among other actions.

Notably, various other devices can further be used to influence communication routing or processing between devices within computing environment 214 and with devices outside of computing environment 214. For example, as shown in FIG. 2, computing environment 214 may include a machine 240 that is a web server. Computing environment 214 can retrieve data of interest, such as client information (e.g., product information, client rules, etc.), technical product details, news, blog posts, e-mails, forum posts, electronic documents, social media posts (e.g., Twitter™ posts or Facebook™ posts), time series data, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices 204-209 may receive data periodically and in real time from a web server or other source. Devices within computing environment 214 may also perform pre-analysis on data it receives to determine if the data received should be processed as part of an ongoing project. For example, as part of a project in which override data can be generated from data for testing a software application, the computing environment 214 can perform a pre-analysis of the data. The pre-analysis can include determining whether the data is in a correct format for use in generating the override data and, if not, reformatting the data into the correct format.

Figure 3:
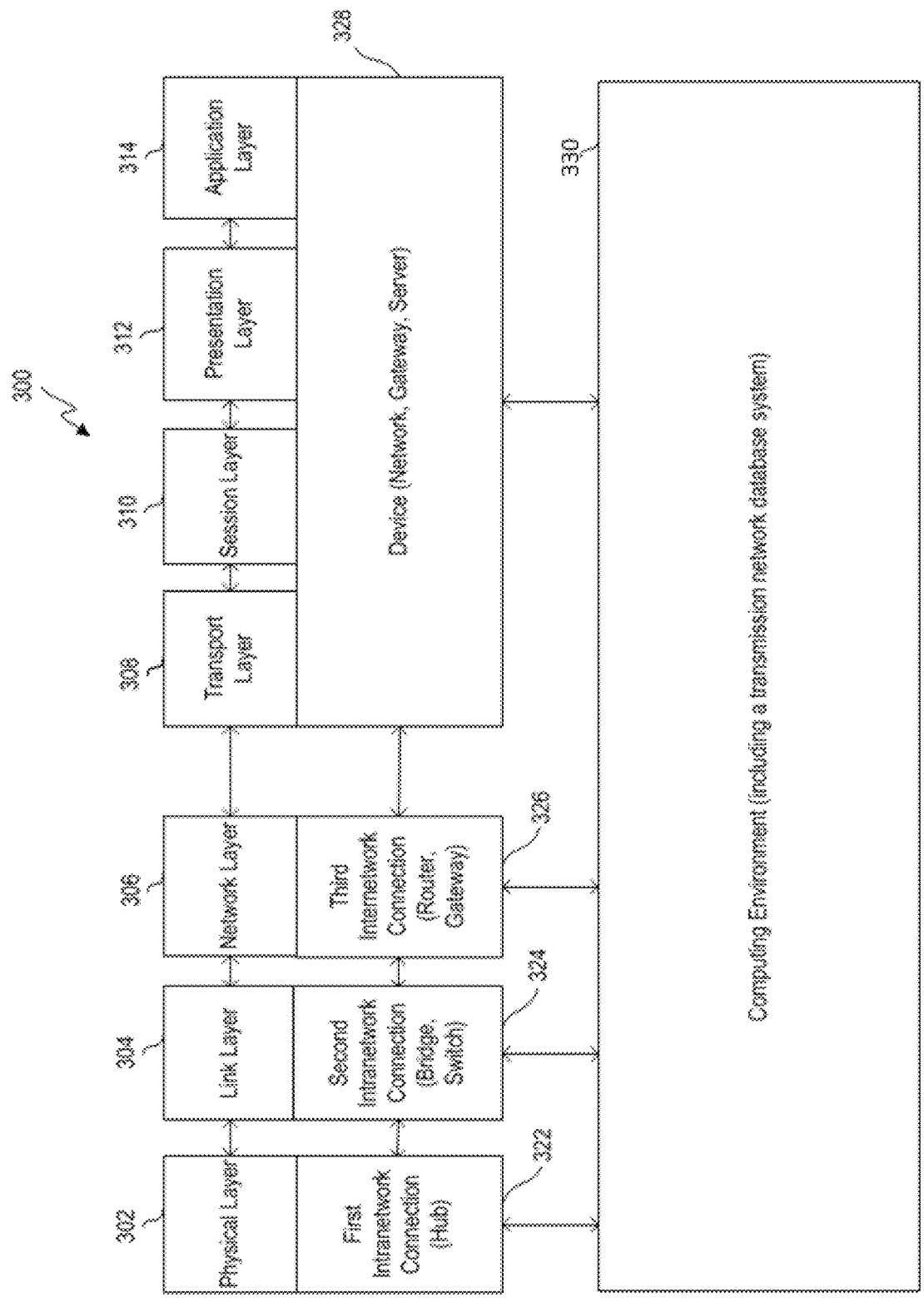
FIG. 3 depicts a block diagram of a model of an example of a communications protocol system according to some aspects.

FIG. 3 is a block diagram of a model of an example of a communications protocol system according to some aspects. More specifically, FIG. 3 identifies operation of a computing environment in an Open Systems Interaction model that corresponds to various connection components. The model 300 shows, for example, how a computing environment, such as computing environment (or computing environment 214 in FIG. 2) may communicate with other devices in its network, and control how communications between the computing environment and other devices are executed and under what conditions.

The model 300 can include layers 302-314. The layers 302-314 are arranged in a stack. Each layer in the stack serves the layer one level higher than it (except for the application layer, which is the highest layer), and is served by the layer one level below it (except for the physical layer 302, which is the lowest layer). The physical layer 302 is the lowest layer because it receives and transmits raw bites of data, and is the farthest layer from the user in a communications system. On the other hand, the application layer is the highest layer because it interacts directly with a software application.

As noted, the model 300 includes a physical layer 302. Physical layer 302 represents physical communication, and can define parameters of that physical communication. For example, such physical communication may come in the form of electrical, optical, or electromagnetic communications. Physical layer 302 also defines protocols that may control communications within a data transmission network.

Link layer 304 defines links and mechanisms used to transmit (e.g., move) data across a network. The link layer manages node-to-node communications, such as within a grid-computing environment. Link layer 304 can detect and correct errors (e.g., transmission errors in the physical layer 302). Link layer 304 can also include a media access control (MAC) layer and logical link control (LLC) layer.

Network layer 306 can define the protocol for routing within a network. In other words, the network layer coordinates transferring data across nodes in a same network (e.g., such as a grid-computing environment). Network layer 306 can also define the processes used to structure local addressing within the network.

Transport layer 308 can manage the transmission of data and the quality of the transmission or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt or format data based on data types known to be accepted by an application or network layer.

Application layer 314 interacts directly with software applications and end users, and manages communications between them. Application layer 314 can identify destinations, local resource states or availability or communication content or formatting using the applications.

For example, a communication link can be established between two devices on a network. One device can transmit an analog or digital representation of an electronic message that includes a data set to the other device. The other device can receive the analog or digital representation at the physical layer 302. The other device can transmit the data associated with the electronic message through the remaining layers 304-314. The application layer 314 can receive data associated with the electronic message. The application layer 314 can identify one or more applications, such as a debugger, an alteration editor, or another application for testing a software application, to which to transmit data associated with the electronic message. The application layer 314 can transmit the data to the identified application.

Intra-network connection components 322, 324 can operate in lower levels, such as physical layer 302 and link layer 304, respectively. For example, a hub can operate in the physical layer, a switch can operate in the physical layer, and a router can operate in the network layer. Inter-network connection components 326, 328 are shown to operate on higher levels, such as layers 306-314. For example, routers can operate in the network layer and network devices can operate in the transport, session, presentation, and application layers.

A computing environment 330 can interact with or operate on, in various examples, one, more, all or any of the various layers. For example, computing environment 330 can interact with a hub (e.g., via the link layer) to adjust which devices the hub communicates with. The physical layer 302 may be served by the link layer 304, so it may implement such data from the link layer 304. For example, the computing environment 330 may control which devices from which it can receive data. For example, if the computing environment 330 knows that a certain network device has turned off, broken, or otherwise become unavailable or unreliable, the computing environment 330 may instruct the hub to prevent any data from being transmitted to the computing environment 330 from that network device. Such a process may be beneficial to avoid receiving data that is inaccurate or that has been influenced by an uncontrolled environment. As another example, computing environment 330 can communicate with a bridge, switch, router or gateway and influence which device within the system (e.g., system 200) the component selects as a destination. In some examples, computing environment 330 can interact with various layers by exchanging communications with equipment operating on a particular layer by routing or modifying existing communications. In another example, such as in a grid-computing environment, a node may determine how data within the environment should be routed (e.g., which node should receive certain data) based on certain parameters or information provided by other layers within the model.

The computing environment 330 may be a part of a communications grid environment, the communications of which may be implemented as shown in the protocol of FIG. 3. For example, referring back to FIG. 2, one or more of machines 220 and 240 may be part of a communications grid-computing environment. A gridded computing environment may be employed in a distributed system with non-interactive workloads where data resides in memory on the machines, or compute nodes. In such an environment, analytic code, instead of a database management system, can control the processing performed by the nodes. Data is co-located by pre-distributing it to the grid nodes, and the analytic code on each node loads the local data into memory. Each node may be assigned a particular task, such as a portion of a processing project, or to organize or control other nodes within the grid. For example, each node may be assigned a portion of a processing task for testing a software application.

Figure 4:
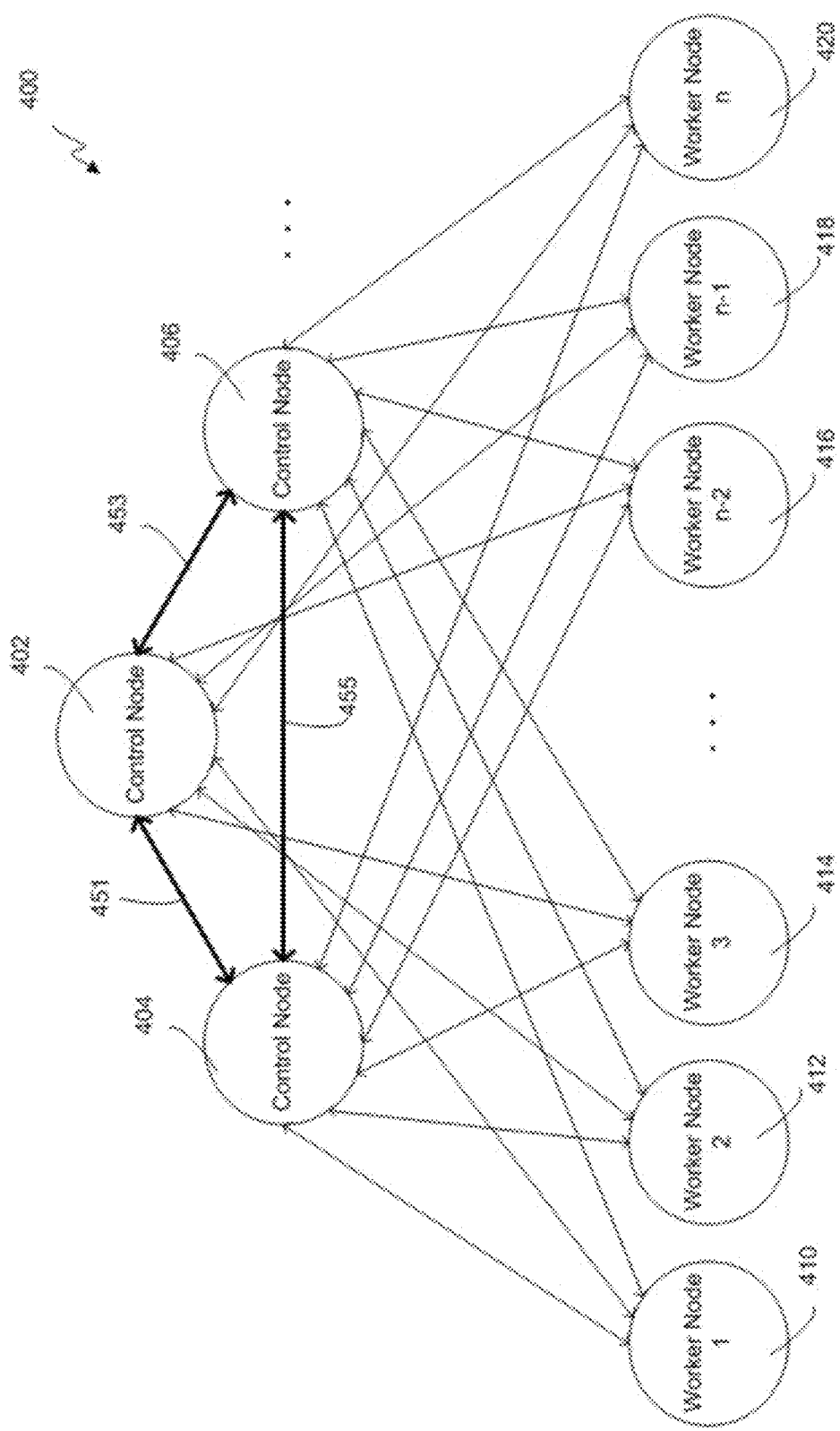
FIG. 4 depicts a hierarchical diagram of an example of a communications grid computing system including a variety of control and worker nodes according to some aspects.

FIG. 4 is a hierarchical diagram of an example of a communications grid computing system 400 including a variety of control and worker nodes according to some aspects. Communications grid computing system 400 includes three control nodes and one or more worker nodes. Communications grid computing system 400 includes control nodes 402, 404, and 406. The control nodes are communicatively connected via communication paths 451, 453, and 455. The control nodes 402-406 may transmit information (e.g., related to the communications grid or notifications) to and receive information from each other. Although communications grid computing system 400 is shown in FIG. 4 as including three control nodes, the communications grid may include more or less than three control nodes.

Communications grid computing system 400 (which can be referred to as a "communications grid") also includes one or more worker nodes. Shown in FIG. 4 are six worker nodes 410-420. Although FIG. 4 shows six worker nodes, a communications grid can include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid computing system 400 may be connected (wired or wirelessly, and directly or indirectly) to control nodes 402-406. Each worker node may receive information from the control nodes (e.g., an instruction to perform work on a project) and may transmit information to the control nodes (e.g., a result from work performed on a project). Furthermore, worker nodes may communicate with each other directly or indirectly. For example, worker nodes may transmit data between each other related to a job being performed or an individual task within a job being performed by that worker node. In some examples, worker nodes may not be connected (communicatively or otherwise) to certain other worker nodes. For example, a worker node 410 may only be able to communicate with a particular control node 402. The worker node 410 may be unable to communicate with other worker nodes 412-420 in the communications grid, even if the other worker nodes 412-420 are controlled by the same control node 402.

A control node 402-406 may connect with an external device with which the control node 402-406 may communicate (e.g., a communications grid user, such as a server or computer, may connect to a controller of the grid). For example, a server or computer may connect to control nodes 402-406 and may transmit a project or job to the node, such as a project or job related to testing a software application. The project may include a data set. The data set may be of any size and can include override data or debugging data. Once the control node 402-406 receives such a project, the control node may distribute the data set or projects related to the data set to be performed by worker nodes. Alternatively, the data set may be receive or stored by a machine other than a control node 402-406 (e.g., a Hadoop data node).

Control nodes 402-406 can maintain knowledge of the status of the nodes in the grid (e.g., grid status information), accept work requests from clients, subdivide the work across worker nodes, and coordinate the worker nodes, among other responsibilities. Worker nodes 412-420 may accept work requests from a control node 402-406 and provide the control node with results of the work performed by the worker node. A grid may be started from a single node (e.g., a machine, computer, server, etc.). This first node may be assigned or may start as the primary control node 402 that will control any additional nodes that enter the grid.

When a project is submitted for execution (e.g., by a client or a controller of the grid) it may be assigned to a set of nodes. After the nodes are assigned to a project, a data structure (e.g., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node 402 receives a project, the primary control node may distribute portions of the project to its worker nodes for execution. For example, a project for testing a software application can be initiated on communications grid computing system 400. A primary control node can control the work to be performed for the project in order to complete the project as requested or instructed. The primary control node may distribute work to the worker nodes 412-420 based on various factors, such as which subsets or portions of projects may be completed most efficiently and in the correct amount of time. For example, a worker node 412 may test a software application using at least a portion of data that is already local (e.g., stored on) the worker node. The primary control node also coordinates and processes the results of the work performed by each worker node 412-420 after each worker node 412-420 executes and completes its job. For example, the primary control node may receive a result from one or more worker nodes 412-420, and the primary control node may organize (e.g., collect and assemble) the results received and compile them to produce a complete result for the project received from the end user.

Any remaining control nodes, such as control nodes 404, 406, may be assigned as backup control nodes for the project. In an example, backup control nodes may not control any portion of the project. Instead, backup control nodes may serve as a backup for the primary control node and take over as primary control node if the primary control node were to fail. If a communications grid were to include only a single control node 402, and the control node 402 were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes 402-406, including a backup control node, may be beneficial.

In some examples, the primary control node may open a pair of listening sockets to add another node or machine to the grid. A socket may be used to accept work requests from clients, and the second socket may be used to accept connections from other grid nodes. The primary control node may be provided with a list of other nodes (e.g., other machines, computers, servers, etc.) that can participate in the grid, and the role that each node can fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it can check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. But, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404, 406 (and, for example, to other control or worker nodes 412-420 within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes 410-420 in the communications grid, unique identifiers of the worker nodes 410-420, or their relationships with the primary control node 402) and the status of a project (including, for example, the status of each worker node's portion of the project). The snapshot may also include analysis or results received from worker nodes 410-420 in the communications grid. The backup control nodes 404, 406 may receive and store the backup data received from the primary control node 402. The backup control nodes 404, 406 may transmit a request for such a snapshot (or other information) from the primary control node 402, or the primary control node 402 may send such information periodically to the backup control nodes 404, 406.

As noted, the backup data may allow a backup control node 404, 406 to take over as primary control node if the primary control node 402 fails without requiring the communications grid to start the project over from scratch. If the primary control node 402 fails, the backup control node 404, 406 that will take over as primary control node may retrieve the most recent version of the snapshot received from the primary control node 402 and use the snapshot to continue the project from the stage of the project indicated by the backup data. This may prevent failure of the project as a whole.

A backup control node 404, 406 may use various methods to determine that the primary control node 402 has failed. In one example of such a method, the primary control node 402 may transmit (e.g., periodically) a communication to the backup control node 404, 406 that indicates that the primary control node 402 is working and has not failed, such as a heartbeat communication. The backup control node 404, 406 may determine that the primary control node 402 has failed if the backup control node has not received a heartbeat communication for a certain predetermined period of time. Alternatively, a backup control node 404, 406 may also receive a communication from the primary control node 402 itself (before it failed) or from a worker node 410-420 that the primary control node 402 has failed, for example because the primary control node 402 has failed to communicate with the worker node 410-420.

Different methods may be performed to determine which backup control node of a set of backup control nodes (e.g., backup control nodes 404, 406) can take over for failed primary control node 402 and become the new primary control node. For example, the new primary control node may be chosen based on a ranking or "hierarchy" of backup control nodes based on their unique identifiers. In an alternative example, a backup control node may be assigned to be the new primary control node by another device in the communications grid or from an external device (e.g., a system infrastructure or an end user, such as a server or computer, controlling the communications grid). In another alternative example, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative example, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed. In some examples, a communications grid computing system 400 can be used to implement one or more features described herein, for example to test a software application.

Figure 5:
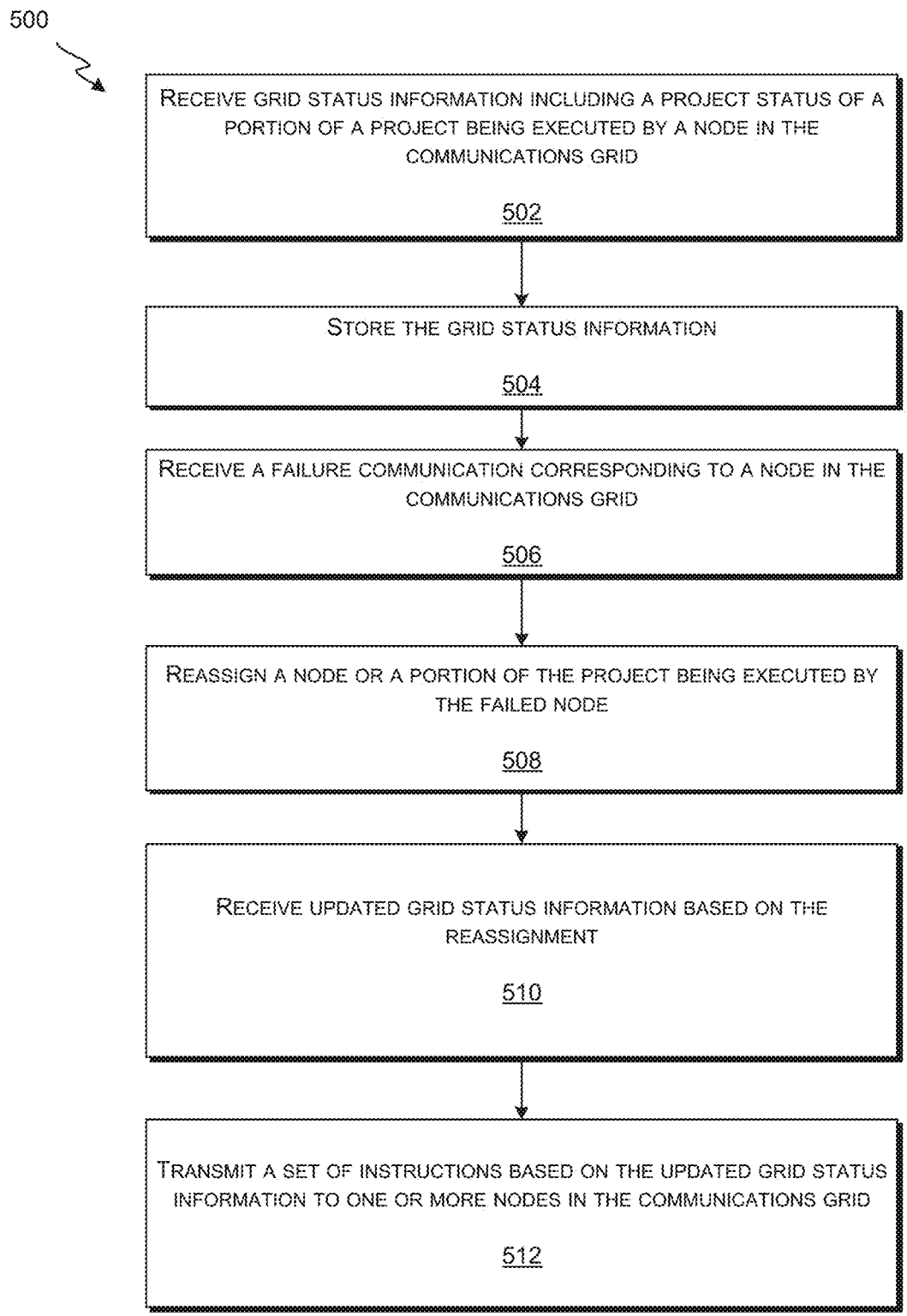
FIG. 5 depicts a flow chart of an example of a process for adjusting a communications grid or a work project in a communications grid after a failure of a node according to some aspects.

FIG. 5 is a flow chart of an example of a process for adjusting a communications grid or a work project in a communications grid after a failure of a node according to some aspects. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
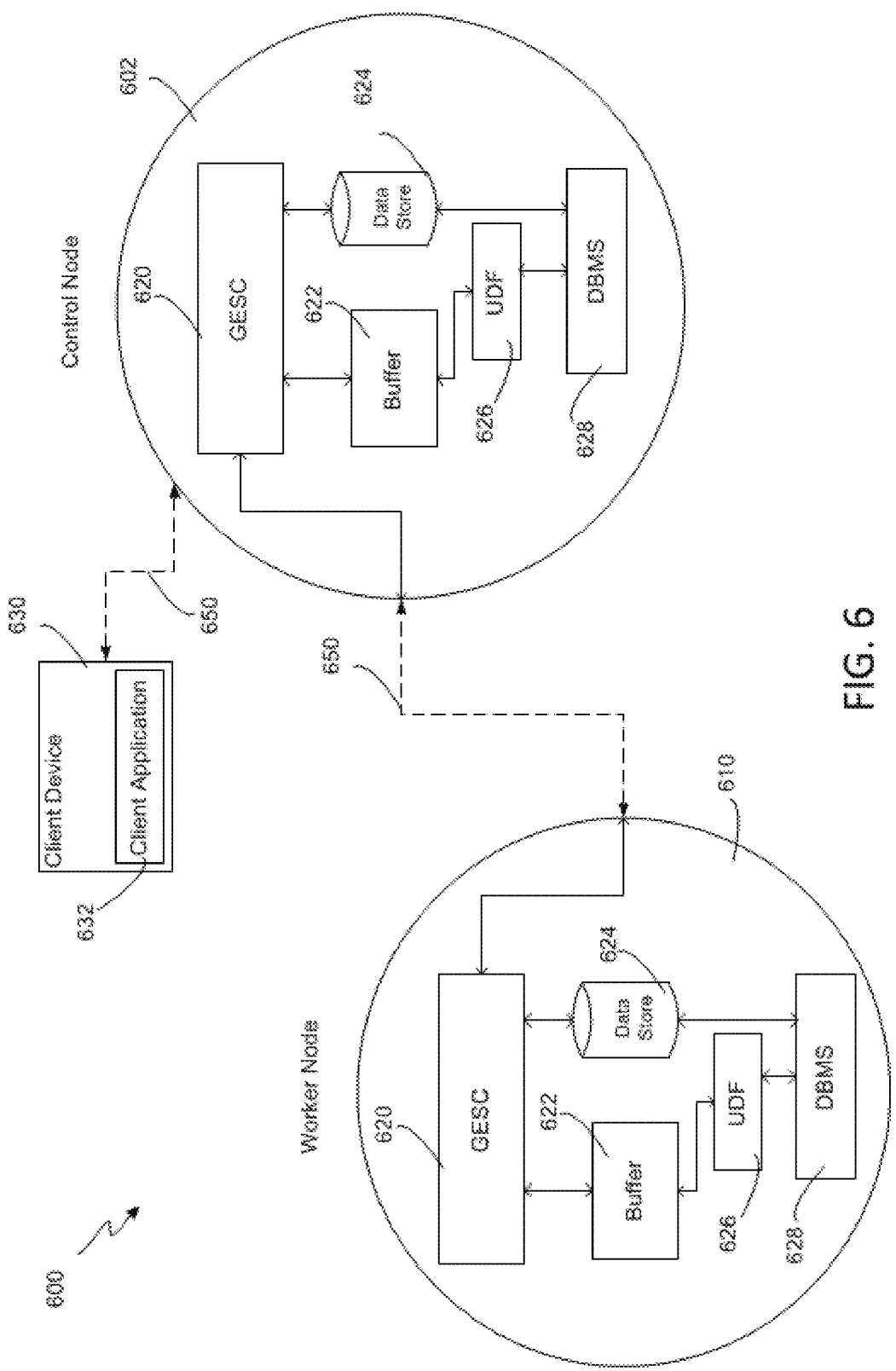
FIG. 6 depicts a block diagram of a portion of a communications grid computing system including a control node and a worker node according to some aspects.

FIG. 6 is a block diagram of a portion of a communications grid computing system 600 including a control node and a worker node according to some aspects. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via communication path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain examples, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
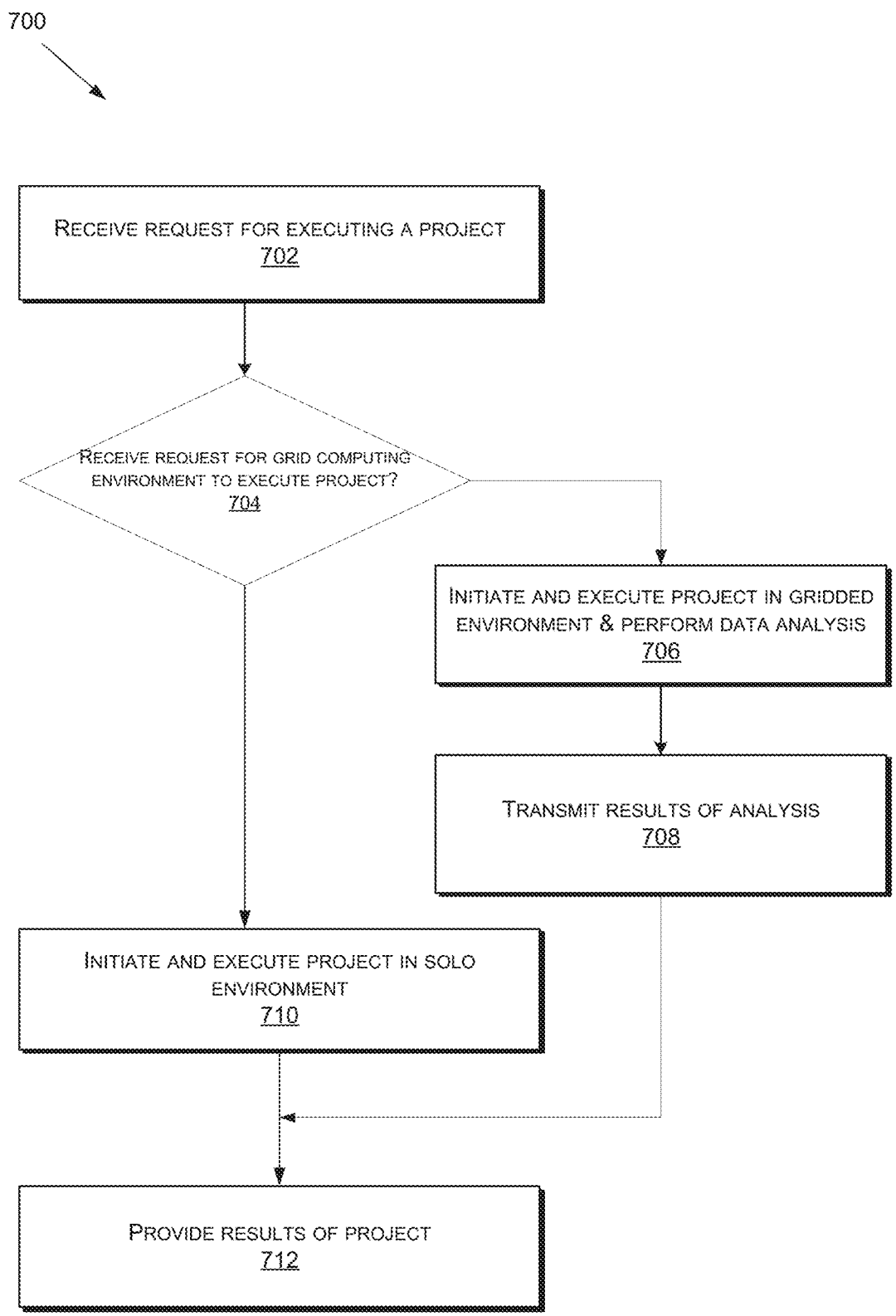
FIG. 7 depicts a flow chart of an example of a process for executing a data analysis or processing project according to some aspects.

FIG. 7 is a flow chart of an example of a process for executing a data analysis or a processing project according to some aspects. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a*-*c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

Figure 8:
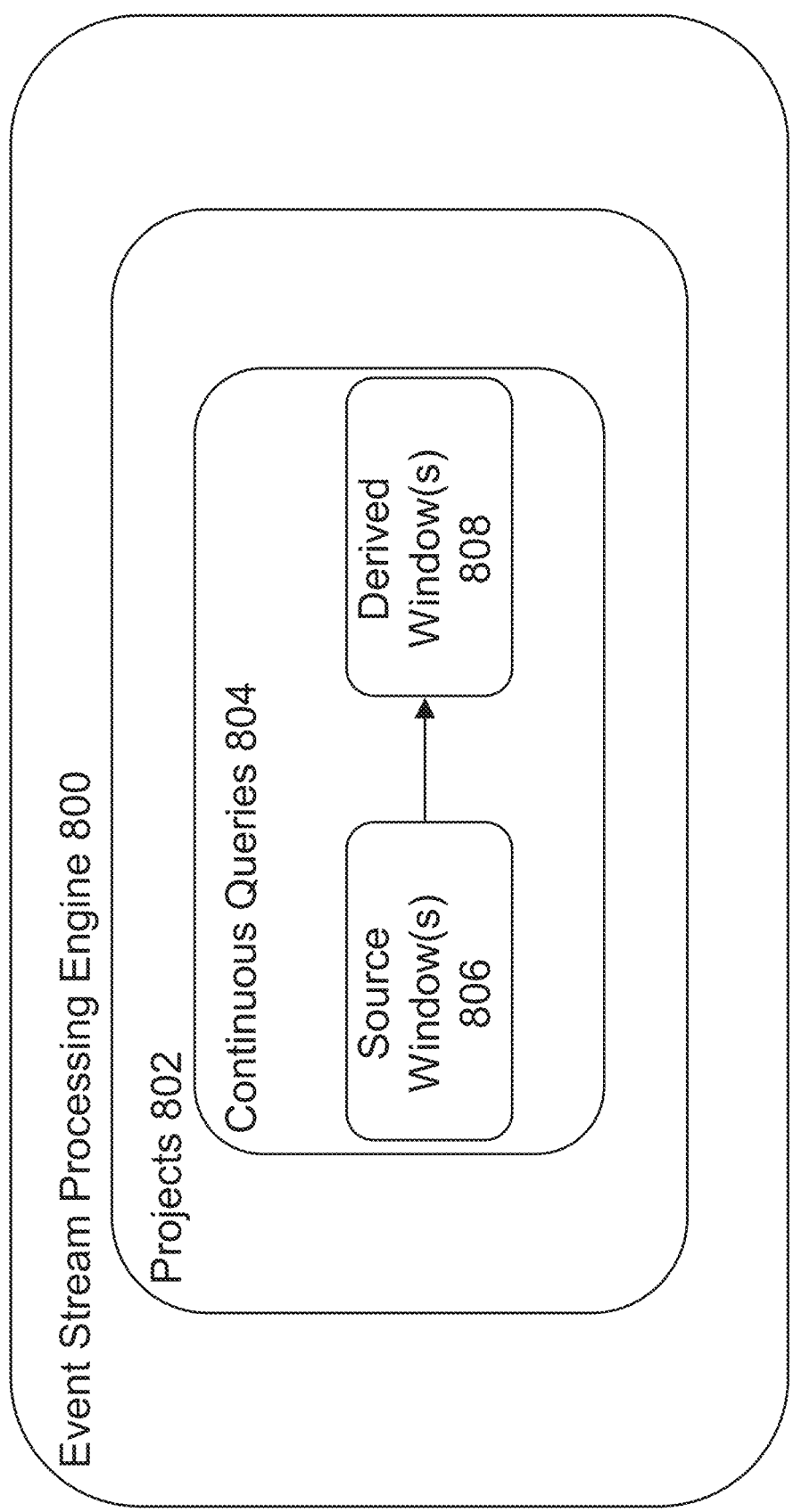
FIG. 8 depicts a block diagram including components of an Event Stream Processing Engine (ESPE) according to some aspects.

FIG. 8 is a block diagram including components of an Event Stream Processing Engine (ESPE) according to some aspects. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

Figure 9:
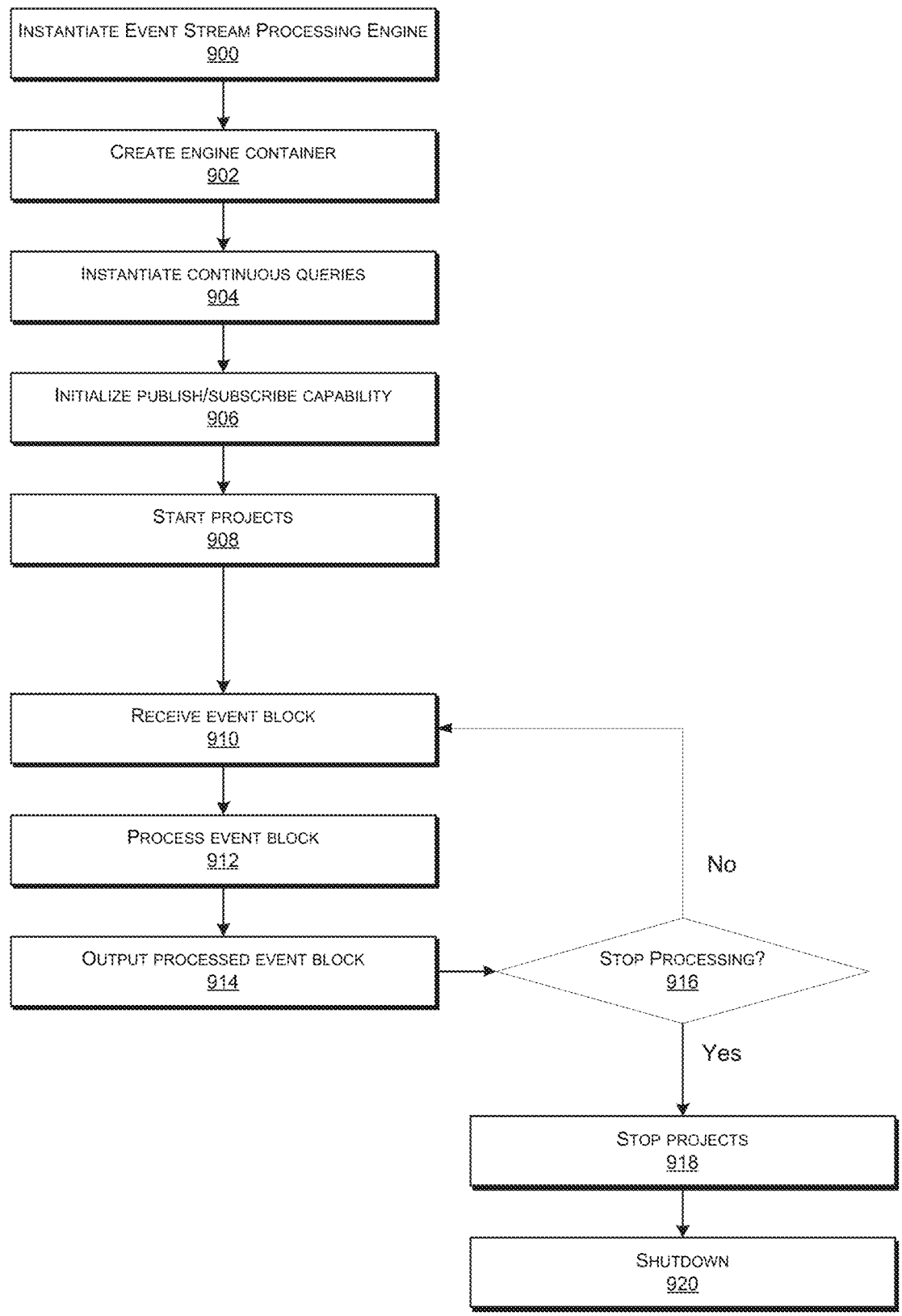
FIG. 9 depicts a flow chart of an example of a process including operations performed by an event stream processing engine according to some aspects.

FIG. 9 is a flow chart of an example of a process including operations performed by an event stream processing engine according to some aspects. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. Various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

Figure 10:
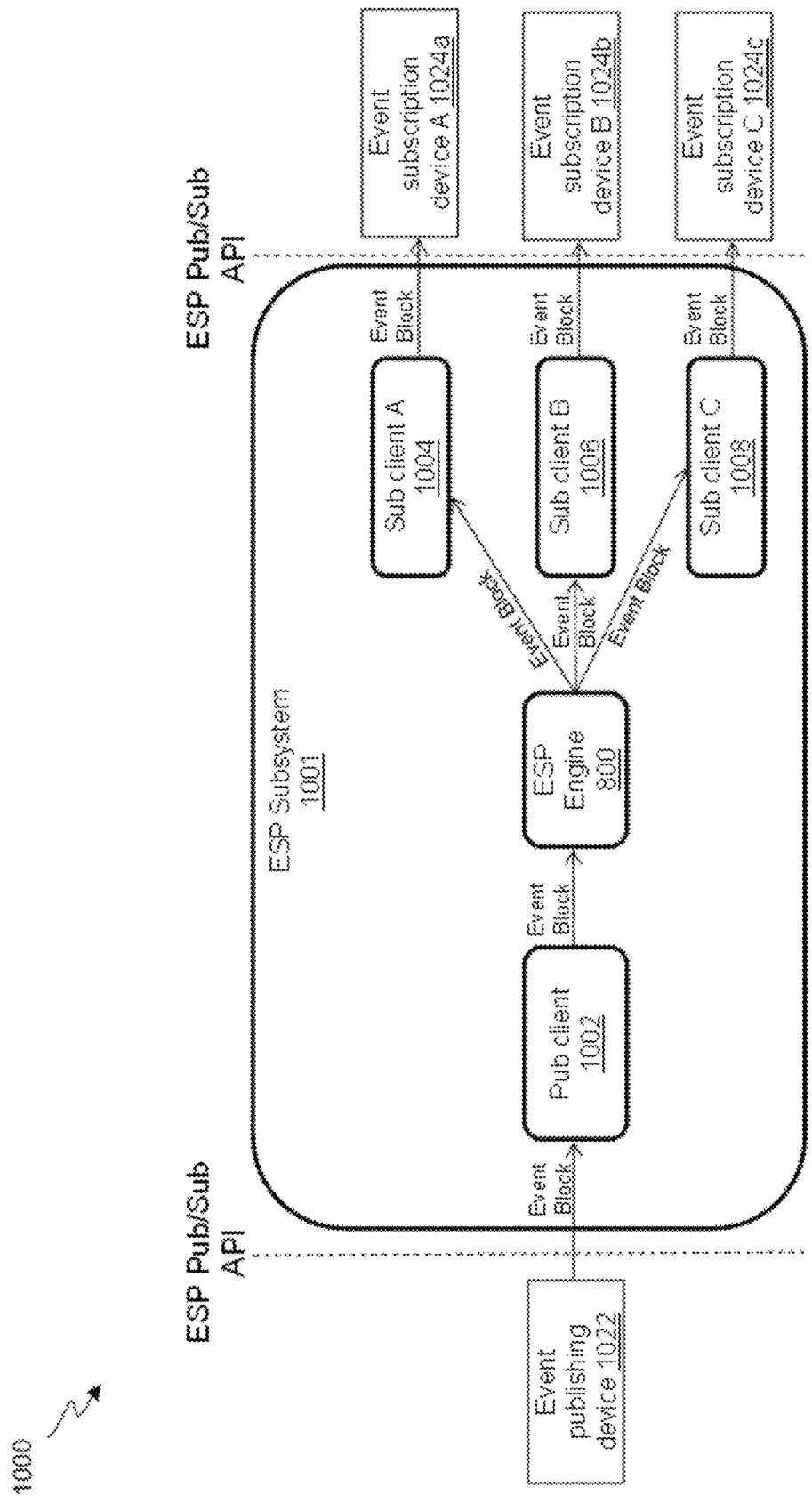
FIG. 10 depicts a block diagram of an ESP system interfacing between a publishing device and multiple event subscribing devices according to some aspects.

FIG. 10 is a block diagram of an ESP system 1000 interfacing between publishing device 1022 and event subscription devices 1024*a-c* according to some aspects. ESP system 1000 may include ESP subsystem 1001, publishing device 1022, an event subscription device A 1024*a*, an event subscription device B 1024*b*, and an event subscription device C 1024*c*. Input event streams are output to ESP subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscription device A 1024*a*, event subscription device B 1024*b*, and event subscription device C 1024*c*. ESP system 1000 may include a greater or a fewer number of event subscription devices of event subscription devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscription device A 1024*a*, event subscription device B 1024*b*, and event subscription device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscription device A 1024*a*, event subscription device B 1024*b*, and event subscription device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscription device A 1024*a* using the publish/subscribe API. Subscribing client B 1006 may be started by an event subscription application B executing at event subscription device B 1024*b* using the publish/subscribe API. Subscribing client C 1008 may be started by an event subscription application C executing at event subscription device C 1024*c* using the publish/subscribe API.

An event block object containing one or more event objects is injected into a source window of the one or more source windows 806 from an instance of an event publishing application on publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscription devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some examples, big data is processed for an analytics project after the data is received and stored. In other examples, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the present disclosure provide technical solutions to technical problems, such as computing problems that arise when an ESP device fails which results in a complete service interruption and potentially significant data loss. The data loss can be catastrophic when the streamed data is supporting mission critical operations, such as those in support of an ongoing manufacturing or drilling operation. An example of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, one or more processors and one or more computer-readable mediums operably coupled to the one or more processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
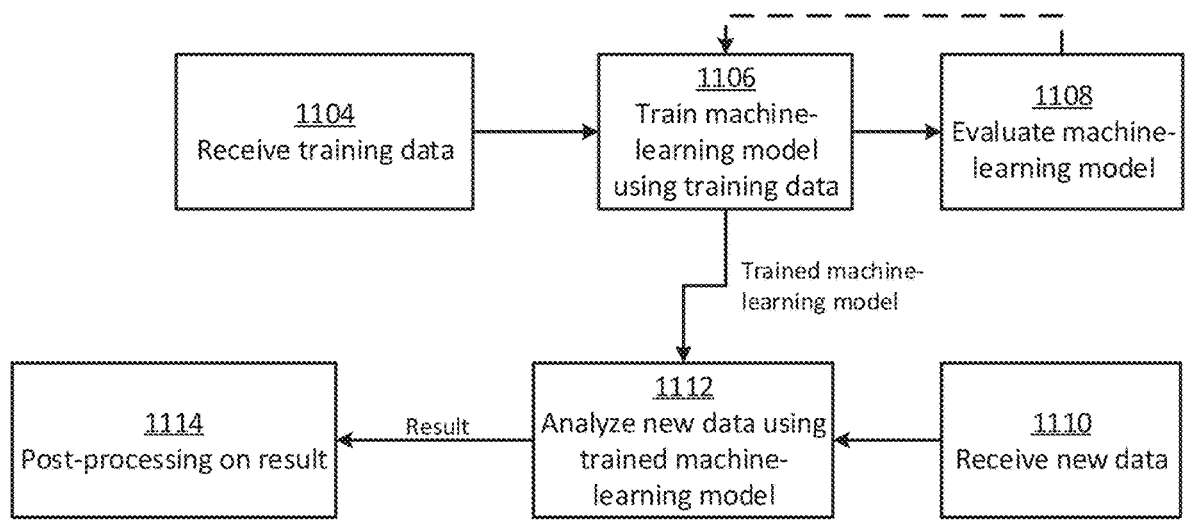
FIG. 11 is a flow chart of an example of a process for generating and using a machine-learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. An evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
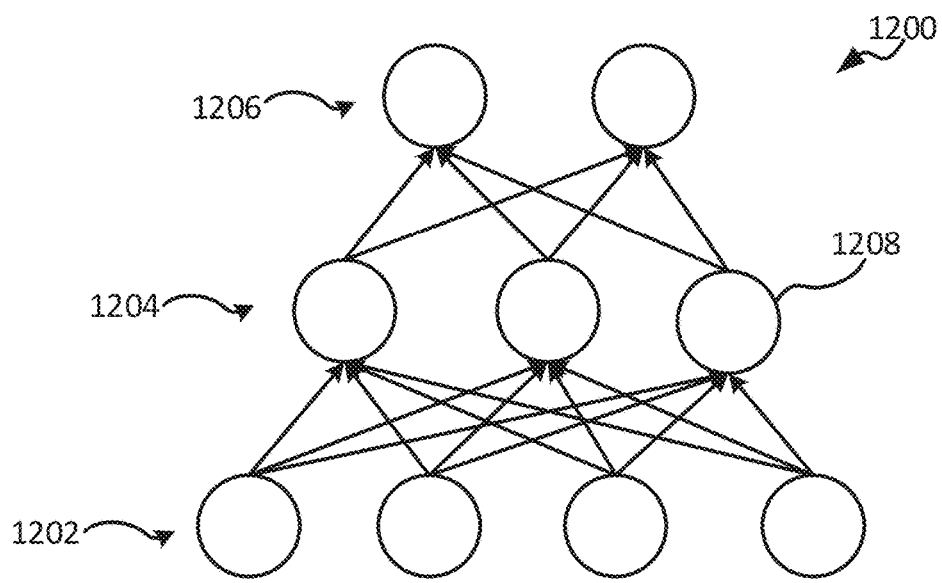
FIG. 12 is a node-link diagram of an example of a neural network according to some aspects.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector.

The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y=\max(x,0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and quickly executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, thermal processing mitigation, processing speed improvements, data communication speed improvements, and/or data efficiency targets and improvements throughout various parts of the system when compared to a homogeneous computing architecture that employs CPUs for general purpose computing.

Figure 13:
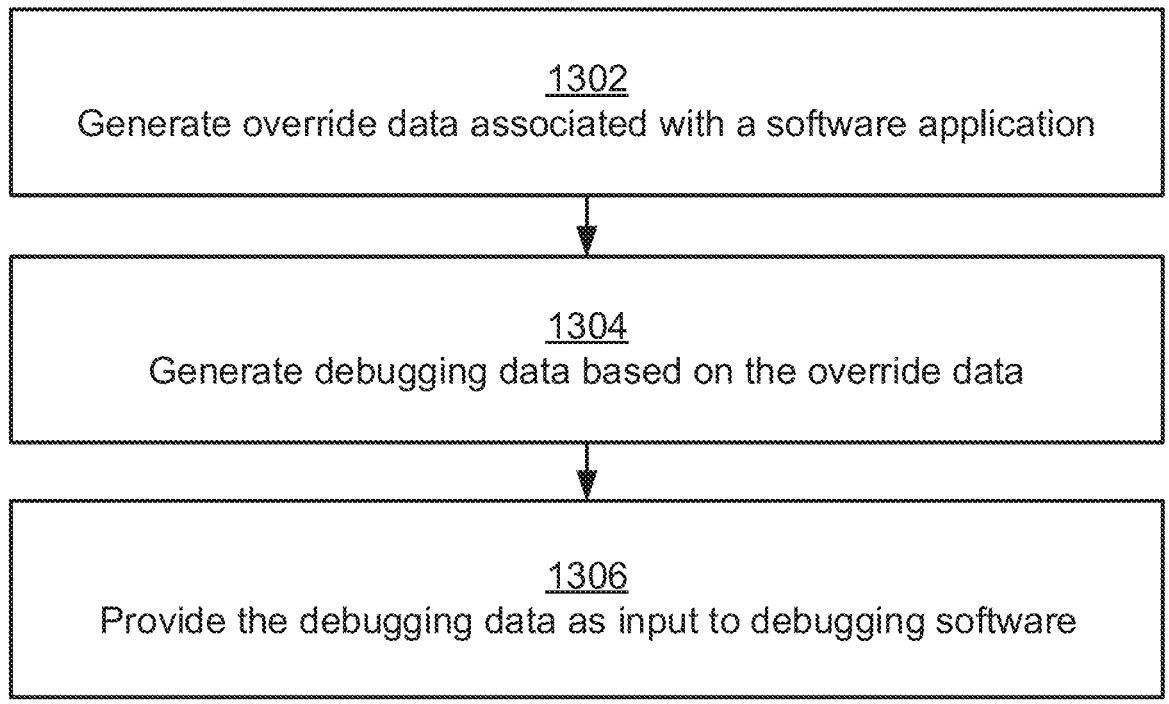
FIG. 13 is a flow chart of an example of a process executable by a processor for generating override data and for generating debugging data usable by debugging software during a software test according to some aspects.

FIG. 13 is a flow chart of an example of a process executable by a processor for generating override data and for generating debugging data usable by debugging software during a software test according to some aspects. In some examples. the process may be implemented using any of the systems or techniques described above.

In block 1302, a processor can generate override data associated with a software application. The processor can generate the override data based on override commands assigned to one or more locations in source code for the software application via a graphical user interface (GUI). An example of the GUI will be described in greater detail below with respect to FIG. 14. In some examples, the processor can generate the override data by updating existing override data with new override data. For example, the processor can update existing override commands with new override commands or update existing override-command locations with new override-command locations based on input provided by the user via the GUI.

The override data can indicate one or more locations (e.g., line numbers) in the source code and one or more corresponding override commands. The locations may each correspond to a logical statement in the source code and have one or more corresponding override commands. Examples of logical statements can include "if" statements or other conditional statements. The override commands can be configured to be translated into debugger commands for execution by debugging software during a software test. In some examples, the override data can be stored in an override file. The override file can have a markup language format (e.g., UML or XML) and may have a unique file extension.

While in this example override data is generated by the processor, in other examples the override data may already exist and may be received by the processor from any suitable source. For example, the processor can receive an override file from memory, a remote computer, a database, or any other source.

In block 1304, the processor can generate debugging data based on the override data. For example, the processor can identify a location described in the override data. The processor can then incorporate a breakpoint into the debugging data based on the location. The processor can also include a debugger command in the debugging data, where the debugger command is configured to be executed at the breakpoint associated with the location. The processor can repeat this process for some or all of the locations described in the override data to generate the debugging data.

Debugger commands can be determined based on the override commands in the override data. A debugger command can be the same as, or different from, an override command. In some examples, the processor can determine a debugger command that corresponds to a given override command by using a lookup table that maps override commands to debugger commands.

Once generated, the debugging data can be stored in one or more debugging files, which may be in a file format compatible with the debugging software. For example, debugging data can include instructions for executing override commands, where the instructions are written so that they are executable by debugging software. The debugger file may have a format that is the same as, or different from, the override file.

Figure 17:
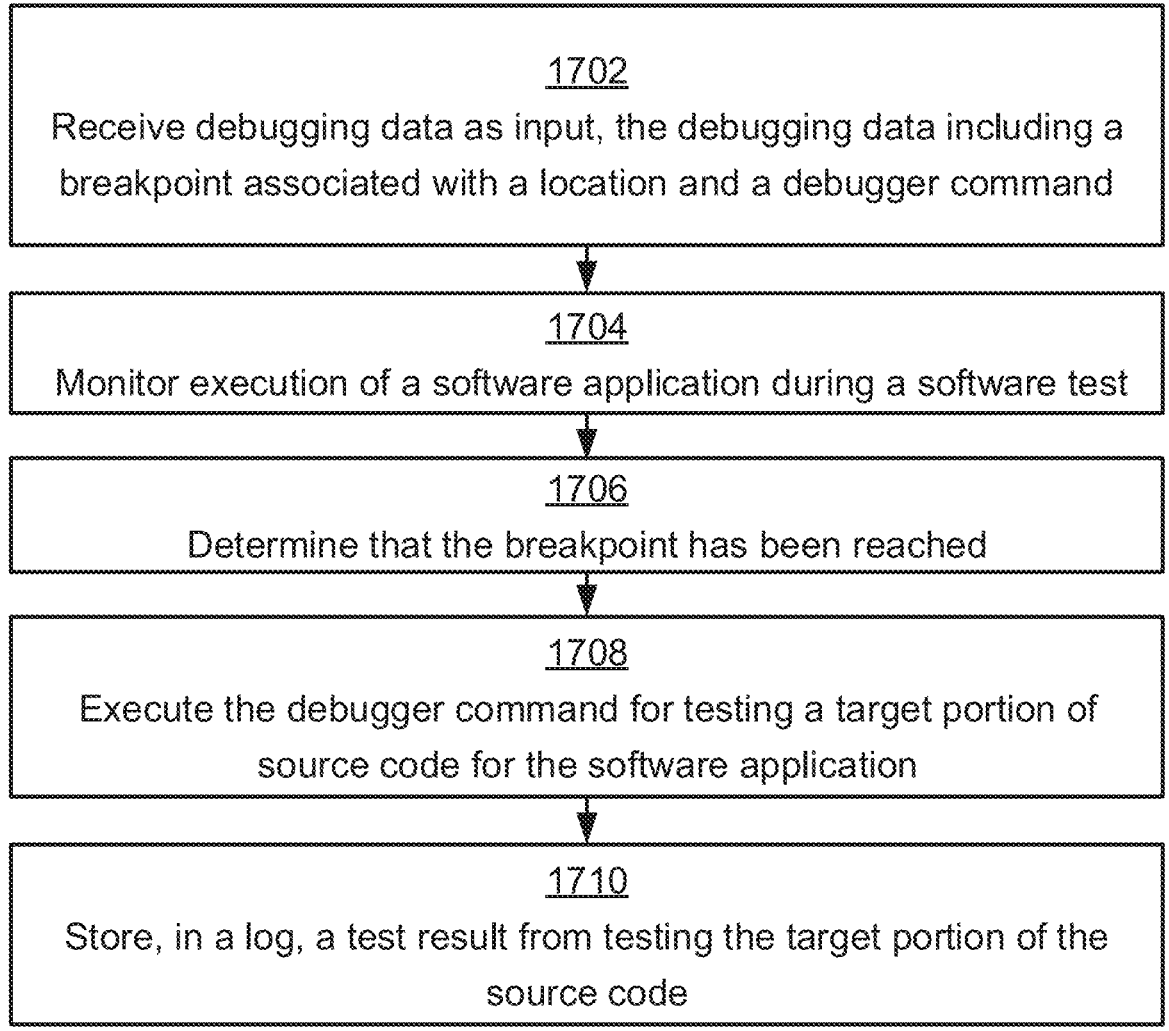
FIG. 17 is a flow chart of an example of a process executable by a debugger during a software test according to some aspects.

In block 1306, the processor can provide the debugging data as input to debugging software. The debugging software can be configured to monitor execution of the software application during a software test and perform one or more operations based on the debugging data. In particular, the debugging software can monitor the real-time values of variables as the software executes during the software test. When a breakpoint is reached, the debugging software can override the actual value of a variable with a new value based on the corresponding override command, causing a certain code pathway to execute. In some examples, the software application may be switched to a testing mode to allow such monitoring by the debugging software. The debugging software can use the debugging data to effectuate alterations and log the results of the alterations for performing a testing process such as a mutation testing process. This is described in greater detail later on with respect to FIG. 17.

Figure 14:
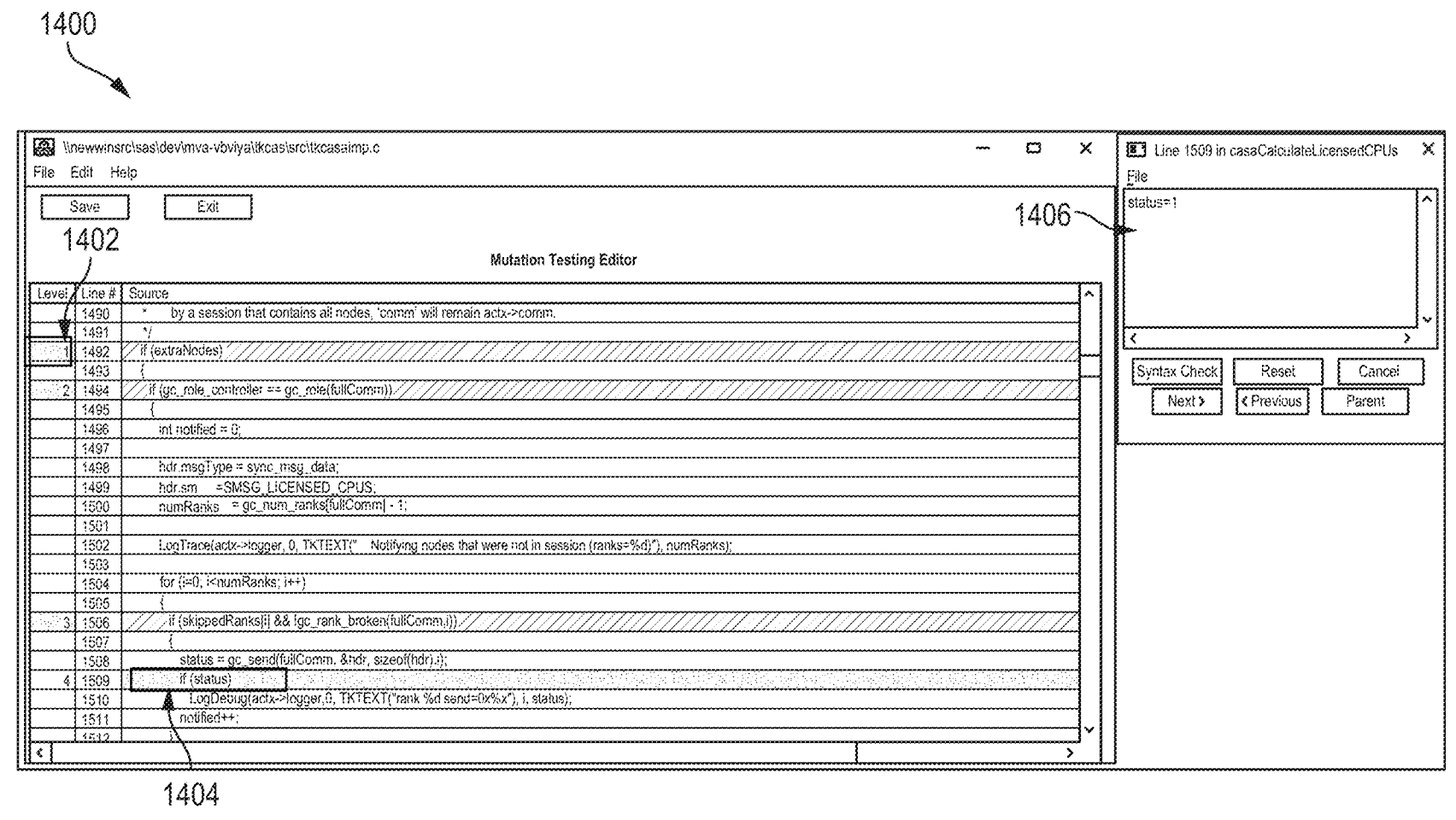

As noted above, the override data can be generated using an alteration editor. One example of such an alteration editor is shown in FIG. 14. In particular, FIG. 14 depicts an example of a graphical user interface 1400 of an alteration editor for generating override data according to some aspects. While FIG. 14 depicts a particular number and arrangement of graphical elements, this is for illustrative purposes and not intended to be limiting. Other examples may include more graphical elements, fewer graphical elements, different graphical elements, or a different combination of the graphical elements shown in FIG. 14. The GUI 1400 can be generated by a processor and its functionality can be implemented using the processor.

As shown, the GUI 1400 can depict the source code associated with a software application along with the line number for each line of the source code. A user may select a source code file to import the source code into the alteration editor. Once imported, the source code can be displayed and color coded. The color-coded highlighting can provide information about lines of the source code. For example, the "source" column of the GUI 1400 can show the content of the source code. In this column, rows can be color-coded with red, yellow, and blue highlighting. Red highlighting can indicate that a code line does not currently have any override commands assigned to it by the user. Yellow highlighting can indicate that a code line is currently being edited via an edit window 1406 such that override commands can be added to it. Blue highlighting can indicate that a code line has one or more override commands assigned to it. The "line number" column of the GUI 1400 can provide the line number for each source code line. In this column, the rows can have a gray highlighting where a function is defined. The gray highlighting information can inform the user of parts of the source code where an alteration statement may be suitable for testing an alternate code execution pathway. In some examples, the GUI 1400 can display the color-coded highlighting at lines in the source code where there are logical statements, function definitions, or any other suitable aspects of the source code. In some examples, the GUI 1400 can show the highlighting information in response to a user click at a location (e.g., line number) in the source code. Of course, these color coding schemes and highlighting schemes are intended to be illustrative and non-limiting. Other schemes may alternatively be used.

The GUI 1400 can also include a "level" column that indicates relationships among the source code lines. For example, there may be a hierarchical relationship among a nested set of logical statements in the source code. The GUI 1400 can output hierarchical levels for the other code lines that have a nesting relationship with a selected code line 1404. For example, the level column can show the embedded level 1402 of an "if" statement. If the level value is 3, the "if" statement can have two parents. The embedded level 1402 of the parent line can have a value of 2 in the level column, and its parent line can have a value of 1 in the level column.

In some examples, the GUI 1400 can display existing override commands assigned to a location in the source code in an edit window or elsewhere in the GUI 1400. The edit window 1406 can contain an edit field where a user can enter multiple override commands. Each override command can be entered on its own line. A double click on a selected code line 1404 can cause the edit window 1406 to appear with any existing override commands assigned to that code line, and the GUI 1400 can highlight that code line in yellow or another color. The edit window 1406 can permit the user to enter new override commands or edit any existing override commands for the selected code line 1404. The level column for any of the parent code lines of the selected code line 1404 can also be highlighted in yellow or using another color.

In some examples, the edit window 1406 can have several buttons. One such button is the "syntax check" button. The "syntax check" button can check the syntax of the override commands entered. As a particular example, if a user presses the "syntax check" button in the edit window 1406 and the syntax for the override command is incorrect, a syntax error statement can appear in the edit window 1406. The syntax of an override command may be incorrect if the override command does not comply with predefined syntactical rules. For example, the contents and format of the override command can be analyzed (e.g., using regular expression commands) to determine whether they comply with the predefined syntactical rules. The syntax error statement can also be output if the user presses the save button on the edit window 1406 and the syntax for a command is incorrect. For example, pressing the save button may automatically invoke the syntax-checking functionality prior to saving the data. The source code can indicate the source line that has the error and the edit window 1406 can be displayed. Upon determining the syntax check is passed, the GUI 1400 can generate the override data.

The edit window 1406 can also include a "reset" button, a "cancel" button, a "next" button, a "previous" button, a "parent" button, or any combination of these. The "reset" button can reset the data to a value that was last saved or can set the value to null if a save has not been made. The "cancel" button can leave the editor, which can cause changes to remain; however, the changes may not be saved. The "next" button can cause the GUI 1400 to move to the next code line in the source file. The "previous" button can cause the GUI 1400 to move to the previous code line in the source file. The "parent" button can cause the GUI 1400 to move to a parent code line of the selected code line 1404, if the level of the selected code line 1404 is greater than 1.

As shown in FIG. 14, the GUI 1400 can also include a "save" button and an "exit" button. The "save" button can be selected to save the override commands and corresponding code lines as override data in an override file. The "exit" button can be selected to exit the GUI 1400. Additional or alternative buttons may also be included in the GUI 1400 in other examples.

As noted above, a user can use the GUI 1400 to assign override commands to locations in the source code for a software application. That information may then be saved as override data, which can be stored in an override file. One example of an override file 1500 with override data is shown in FIG. 15. Although the override data is shown in FIG. 15 as being located within a single override file 1500 for simplicity, it will be appreciated that in other examples the override data may span multiple override files.

As shown, the override file 1500 can be written in markup language (e.g., XML) and can identify global, local, logical, or other aspects of the source code, which can be denoted with markup tags. The markup tags can also be used to identify the locations to which override commands are assigned in the source code and describe the override commands associated with the locations. The override file 1500 can identify source code locations in any suitable manner (e.g., by line number or label). For example, a logical "if" statement markup tag 1502 in the override file 1500 can have hierarchically embedded therein a line number markup tag 1504 to indicate a location of an "if" statement at line 1509 in the source code. A command markup tag 1506 associated with the "if" statement markup tag 1502 can identify the override command assigned to the "if" statement via the GUI 1400. In the example shown in FIG. 15, the override command "status=1" is located between the command markup tags 1506. Therefore, this override command may be applicable to the code line 1509.

In some examples, the override file 1500 can indicate a file name, time stamp, and image location associated with the source code, for example as denoted by markup tags. The override file 1500 may also include line numbers to skip in the source code, for example as denoted by markup tags. The timestamp can be included to indicate when the override file 1500 was last updated. The timestamp can be in the form YYY/MM/DD HH:MM:SS. The image location can reference the name of a shared library or dynamic link library. A skip markup tag can indicate a start line number and an end line number, which can define an interval of line numbers in the source code to which override commands may not apply. For example, the line numbers within the allotted interval can define a constructor, class, or any other elements of the source code, the execution of which may not be modified using override commands. Further, the override file 1500 can indicate global variables, define variables, function (or routine) names, function parameters, local variables, labels, logical statements, and other aspects of the source code, for example as denoted by markup tags. The override file 1500 can denote multiple "if" statements in the source code and their locations.

In some examples, additional markup tags can be included between "if" statement markup tags 1502 to describe other parameters associated with the "if" statement. For example, additional markup tags can be included to indicate an associated ELSE statement if applicable (e.g., an "if" statement may not have a corresponding "else" statement), the embedded level of the logical statement (e.g., if an "if" statement is nested inside of another if or else block), the location of the parent logical statement, the logical statement from the source code, and one or more override commands.

The override commands can have any suitable form. For example, the override commands can be implemented as debug statements. Examples of override commands can include a go to <label>, jump else, jump <n>, bd*|bd n–bd*, xxx=yyy, or any combination of these. A "go to <label>" statement can cause the execution pathway to jump to <label>, which is a label that is defined in the current function of interest of the override file 1500. A "jump else" statement can jump to the else statement for the current "if" statement. A "jump <n>" statement can be for skipping n code lines. A "bd*|bd n–bd*" statement can disable the breakpoints for all logical levels above the level of the current logical statement. A "bd n" statement can be to disable the breakpoint at a location that is n number of hierarchical levels above the level of the current "if" statement. An "xxx=yyy" statement, where "xxx" can assign the value of "yyy" to the variable "xxx." In some examples, "xxx" can be a local variable, a global variable, or a parameter to the routine. Similarly, "yyy" can be a local variable, a global variable, or a parameter to the routine. The value of "yyy" can be any suitable value, such as NULL, FALSE, TRUE, a number (e.g., negative, positive), or a hex value starting with 0x. A "TKSTATUS(<tkstatus name>)" statement can display a number that corresponds to a message. The value of TKStatus can be any suitable value, for example, a proprietary code number used by SAS Institute® of Cary N.C.

After the override file 1500 has been generated, the source code for the corresponding software program may be updated due to ongoing development. As a result, the line numbers of various logical statements and functions in the source code may change. This may render the override data outdated, because override commands may be assigned to old line numbers rather than current line numbers, which could cause numerous problems during software testing. To avoid these problems, some examples of the present disclosure may allow for the override file 1500 to be automatically updated based on changes to the source code.

For example, the system can include an update module that is executable by the processor. In some examples, the update module may be part of the alteration editor. The update module can import an existing override file 1500, where the override file 1500 was previously generated based on a source code file for a software application. The update module can also import the current version of the source code file. The update module can then determine whether the source code file was modified after the override file 1500 was last updated, for example by comparing a timestamp in the override file 1500 to a last modification date associated with the source code file. The timestamp in the override file 1500 can indicate when the override file 1500 was last updated. If the timestamp in the override file 1500 predates the last modification date associated with the source code file, it may mean that the override file 1500 is outdated. So, the update module may automatically update the override file 1500 based on the current source code file. For example, the update module can identify the current location in the source code file of each logical statement specified in the override file 1500, determine whether the current location of the logical statement in the source code file matches the line number assigned to the logical statement in the override file 1500 and, if not, update the line number in the override file 1500 to match the current location in the source code. In some examples, the update module can determine the current location of a logical statement in the source code based on relevant information in the override file 1500. For example, the update module can extract the code content associated with the logical statement from between tags (e.g., "<src></src>" tags) in the override file 1500 and search for said code content in the source code file. Using these techniques, the update module can automatically update the override file 1500 based on changes to the corresponding source code file, which may help ensure that the override file 1500 remains up-to-date.

While the example shown in FIG. 15 includes a certain amount and configuration of override data, it will be appreciated that this is for illustrative purposes and not intended to be limiting. Other examples may include more, less, different, or a different configuration of the override data shown in FIG. 15.

Figure 16:
FIG. 16 depicts an example of a debugger file for testing a software application according to some aspects.

FIG. 16 depicts an example of a debugger file 1600 for testing a software application according to some aspects. As discussed above, the debugger file 1600 can be created based on the override data. The debugger file 1600 can have a format that is different than the format of the override data, so as to be compatible with the debugging software. For example, the debugger file 1600 can be compatible with the debugging software if the debugger file 1600 has commands that are executable by the debugging software, if the debugger file 1600 is written in a language (e.g., a markup language) that is understandable by the debugging software, if the debugger file 1600 has a syntax that is accepted by the debugging software, or any combination of these. The debugging data can include debugger commands, which may be determined based on the override commands in the override data. The debugger commands can be configured for modifying the execution path of the software application or monitoring the execution of the software application. For example, the debugger file 1600 can include a breakpoint that includes a location in the source code and a debugger command to be executed upon reaching the location in the source code during a software test. In some examples, there may be multiple debugger files 1600, each including at least one breakpoint, and the debugger files 1600 can be generated by converting the override data into debugging data. The debugger file 1600 may include multiple breakpoints associated with multiple debugger commands.

In the example shown in FIG. 16, the debugger file 1600 includes two breakpoints at line numbers 101 and 104 in the source code. The debugger file 1600 also includes debugger commands (e.g., located between curly brackets) to be executed at those breakpoints. For example, the debugger file 1600 specifies that a debugger command of "set status=1" is to be performed in relation to line number 104 for setting the variable "status" to a value of "1". This can correspond to the override command described in relation to the override file 1500 of FIG. 15 for setting the variable "status" to have a value of "1".

In some examples, the debugger file 1600 can include one or more debugger commands for testing whether a nested "if" statement succeeds. The one or more debugger commands may include one or more breakpoints. For example, the debugger file 1600 may include a breakpoint for each parent "if" statement, which can test that each of the parent "if" statements also succeeds. The debugging software can make a recursive call for the parents of an "if" statement. Once it has found the top level parent, the recursive software routine can take the breakpoint and debugger command information, and the process of generating the debugging data can further include adding additional data to the debugger file 1600. Additional data to be added to the debugger file 1600 can include a breakpoint for the "image_name" (e.g., a shared library or dynamic link library (DLL) name), function line number, "if" statement line number, and the debugger command to execute when the breakpoint is encountered. Examples of debugger commands that may be executed when the breakpoint is encountered can include a disable command, which can disable the breakpoint that was hit; a show command to show the source code for the area around where the breakpoint was encountered; and a traceback command to demonstrate where the breakpoint occurred for crashes and hangs to be later debugged. The processor can convert the override command for the particular "if" statement into a debugger command that has the appropriate syntax and can write the debugger commands to the debugger file 1600. As shown in FIG. 16, the debugger file 1600 can echo a line to the log file that signifies the end of the "if" statement breakpoint and add a "go" or "continue" command. The debugging software can then fall out of the recursive routine back to the previous level and repeat the above-mentioned steps until the breakpoint and debugger command of a lowest level "if" statement are written to the debugger file 1600.

Further, the debugging data may include other debugger commands. The debugging data can include a log command to create a particular log file for storing test results of the software test. The debugging data can include a debugger command to ignore catching the broken pipe signal SIGPIPE or SIGFPE for writing to a socket that is no longer connected. The debugging data can include a "go" command that can indicate starting the execution of the current or modified code execution path for the software application after a breakpoint. The debugging data can include a "where" or traceback command to be issued in the case of a crash. The traceback command can give a location of where the crash occurred and a location of where the breakpoint occurred that can be written to the log file. The debugger file 1600 can include debugger commands for turning off writing to the log file. The debugger file 1600 can include a "quit" or "exit" command, with which the file can be saved and the file can be closed. In some examples, the debugging software can be the Linux GNU Debugger (GDB) and can allow a debug session to take a debugger file that contains debugger commands.

Once generated, the debugger file 1600 (or the debugging data therein) can be provided to debugging software for use during a software test. One example of this process is shown FIG. 17, which will now be described below.

In block 1702, the debugging software can receive debugging data as input. The debugging data can be in a format (e.g., XML or ".debug") readable by the debugging software. The debugging data may have previously been generated based on override data, which in turn may have been manually via an alteration editor or automatically generated by a computer. The debugging data can include a breakpoint and a corresponding debugger command. The breakpoint can correspond to a location in the source code for a software application. The debugger command can be a command that is to be executed by the debugging software when the location is reached during a software test.

In block 1704, the debugging software can monitor execution of the software application during the software test. As part of the debugging process, the debugging software can collect and store coverage data describing the test coverage of the software test. To do so, the debugging software may interface with test coverage tools, like PureCoverage® by Unicom® or gcov (which is a utility that comes with the GNU Compiler Collection (GCC) suite). These tools may be executed and their results logged for reporting to the user, for example in combination with other test results.

In block 1706, the debugging software can determine that the breakpoint has been reached. This may involve determining that the code line corresponding to the breakpoint was reached. For example, during the software test, the software application can step through various lines of program code. Eventually, one of those lines may correspond to the particular code line associated with the breakpoint, at which point the debugging software can determine that the breakpoint was reached.

In block 1708, the debugging software can execute the debugger command for testing a target portion of source code for the software application, based on determining that the breakpoint was reached. In particular, the debugging software can determine that the particular code line associated with the breakpoint was reached and consequently execute the debugger command associated with the particular code line. The debugging software can determine which debugger command to execute based on a correspondence in the debugging data between the particular code line and the debugger command. The target portion of the code can be different from another segment of code that would otherwise be executed absent the debugger command.

In some examples, the debugging software can modify the execution path of the software application by executing the particular debugger command (e.g., without recompiling the code). For example, the debugger command can be a "go to" command that jumps to a label in the source code. The debugging software can parse the debugging data to determine the breakpoints and corresponding debugger commands to execute.

In block 1710, the debugging software can store a test result from testing the target portion of the source code. The test result can be stored in a log file. The test result can be log data describing what occurred in response to execution of the debugger command. Examples of test results can include the location of any of the breakpoint; a signal; a traceback; any errors associated with the breakpoint, signal, or traceback; or any other suitable log data for debugging a software test. Errors may be segmentation violations or other types of errors associated with executing the software test.

As discussed above, there can be multiple debugger commands for one or more breakpoints. In some examples, the debugging software can read the debugger file and generate a list of functions and logical statements that have debugger commands associated with them. For example, there can be n different "if" statements to test, where n is the number of "if" statements that have override commands. Alternatively, the debugging software can read the debugger file and generate a list of debugger commands associated with various logical statements and functions. To effectuate each debugger command, some or all of operations 1704-1710 may be iterated multiple times. For example, if there are ten debugger commands corresponding to one or more breakpoints in the debugging data, the software test may be iterated ten times on the software application, with a different debugger command applied each time, so that all of the target execution pathways associated with the ten debugger commands are tested. When there are multiple debugger commands corresponding to a single breakpoint in the debugging data, the debugging software can implement the debugger commands in any suitable order, such as in sequential order, during multiple iterations of the software test. During each iteration, the debugging software can take the next item (e.g., debugger command) on the list and execute it to implement a corresponding alteration.

After logging the test result from a particular run of the software test, the debugging software can re-execute the software test again until all debugger commands corresponding to all breakpoints have been executed. In some examples, all the test results from running the test multiple times can be stored, by the debugging software, in the same log file or separate log files. In some examples, the system can write a summary from each of one or more log files including all the test results from the software test to a report file. The system can combine coverage data that was captured during the software test with the report file.

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

The invention claimed is:

1. A method comprising:
    receiving, by a processor, override data that is separate from and associated with source code for a software application, the override data including a location of a logical statement in the source code and the override data including an override command for execution upon reaching the location during a software test of the software application, the override command being configured to cause debugging software to modify an execution path of the software application during the software test from a first code pathway that excludes a target portion of the source code to a second code pathway that includes the target portion of the source code;
    generating, by the processor, debugging data based on the override data, the debugging data including a breakpoint associated with the location and the debugging data including a debugger command corresponding to the override command, the debugging data having a format that is different from the override data for compatibility with the debugging software;
    providing, by the processor, the debugging data as input to the debugging software, the debugging software being configured to monitor execution of the software application during the software test and responsively:
        determine that the breakpoint has been reached;
        in response to determining that the breakpoint has been reached, execute the debugger command for testing the target portion of the source code; and
        store, in a log, a test result from testing the target portion of the source code;
    executing, by the processor, a test coverage tool to generate coverage data indicating how much of the source code was tested by the software test;

determining, by the processor and based on the log, that an error occurred during the software test;

generating, by the processor, a report that includes the coverage data and traceback information associated with the error; and outputting, by the processor, the report for display to a user.

2. The method of claim 1, wherein the override data includes (i) one or more locations of one or more logical statements in the source code and (ii) a plurality of override commands for execution upon reaching the one or more locations during a plurality of iterations of the software test, wherein the debugging data includes one or more breakpoints associated with the one or more locations and a plurality of debugger commands corresponding to the plurality of override commands, and wherein the debugging software is configured to monitor the execution of the software application during the plurality of iterations of the software test and, for each iteration in the plurality of iterations of the software test:

extract a respective debugger command from among the plurality of debugger commands defined in the debugging data, wherein the respective debugger command corresponds to a particular breakpoint of the one or more breakpoints and is configured for testing a corresponding portion of the source code;

determine that the particular breakpoint has been reached;

in response to determining that the particular breakpoint has been reached, execute the respective debugger command for testing the corresponding portion of the source code; and store, in the log, a respective test result from testing the corresponding portion of the source code.

3. The method of claim 2, wherein the one or more locations is a single line number corresponding to a single logical statement in the source code, the plurality of debugger commands correspond to the single line number and are configured for testing different corresponding portions of the source code, and the one or more breakpoints is a single breakpoint.

4. The method of claim 2, further comprising testing software configured to execute the plurality of iterations of the software test on the software application without recompiling the source code with a respective modification for each iteration of the plurality of iterations.

5. The method of claim 1, further comprising:

generating a graphical user interface that includes a first graphical object through which user can assign one or more override commands to one or more locations in the source code;

detecting a user interaction with a second graphical object of the graphical user interface; and in response to detecting the user interaction with the second graphical object:

executing a syntax check on the one or more override commands to determine whether the one or more override commands are compatible with the debugging software; and in response to determining that the one or more override commands passed the syntax check, generate the override data to include the one or more locations and to include the one or more override commands assigned to the one or more locations.

6. The method of claim 5, wherein the graphical user interface is configured to display at least a portion of the source code in a color coding that indicates which of lines of the source code have override commands assigned thereto by the user.

7. The method of claim 5, further comprising:

identifying a set of nested logical statements in the source code;

determining a respective hierarchical level for each logical statement in the set of nested logical statements; and generating the graphical user interface to display the respective hierarchical level for each logical statement in the set of nested logical statements.

8. The method of claim 1, further comprising:

determining, by parsing the source code, a plurality of logical statements in the source code;

determining, by parsing the source code, a plurality of functions in the source code;

determining, by parsing the source code, a plurality of global variables in the source code; and generating the override data based on the plurality of logical statements, the plurality of functions, and the plurality of global variables.

9. The method of claim 1, wherein the target portion of the source code is different from another portion of the source code configured to be traversed during the software test absent the override command.

10. A system comprising:

one or more processors; and one or more memory devices including instructions that are executable by the one or more processors for causing the one or more processors to:

receive override data that is separate from and associated with source code for a software application, the override data including a location of a logical statement in the source code and the override data including an override command for execution upon reaching the location during a software test of the software application, the override command being configured to cause debugging software to modify an execution path of the software application during the software test from a first code pathway that excludes a target portion of the source code to a second code pathway that includes the target portion of the source code;

generate debugging data based on the override data, the debugging data including a breakpoint associated with the location and the debugging data including a debugger command corresponding to the override command, the debugging data having a format that is different from the override data for compatibility with the debugging software;

provide the debugging data as input to the debugging software, the debugging software being configured to monitor execution of the software application during the software test and responsively:

determine that the breakpoint has been reached;

in response to determining that the breakpoint has been reached, execute the debugger command for testing the target portion of the source code; and store, in a log, a test result from testing the target portion of the source code;

execute a test coverage tool to generate coverage data indicating how much of the source code was tested by the software test;

determine, based on the log, that an error occurred during the software test;

generate a report that includes the coverage data and traceback information associated with the error; and output the report for display to a user.

11. The system of claim 10, wherein the override data includes (i) one or more locations of one or more logical statements in the source code and (ii) a plurality of override commands for execution upon reaching the one or more locations during a plurality of iterations of the software test, wherein the debugging data includes one or more breakpoints associated with the one or more locations and a plurality of debugger commands corresponding to the plurality of override commands, and wherein the debugging software is configured to monitor the execution of the software application during the plurality of iterations of the software test and, for each iteration in the plurality of iterations of the software test:
   extract a respective debugger command from among the plurality of debugger commands defined in the debugging data, wherein the respective debugger command corresponds to a particular breakpoint of the one or more breakpoints and is configured for testing a corresponding portion of the source code;
   determine that the particular breakpoint has been reached;
   in response to determining that the particular breakpoint has been reached, execute the respective debugger command for testing the corresponding portion of the source code; and
   store, in the log, a respective test result from testing the corresponding portion of the source code.

12. The system of claim 11, wherein the one or more locations is a single line number corresponding to a single logical statement in the source code, the plurality of debugger commands correspond to the single line number and are configured for testing different corresponding portions of the source code, and the one or more breakpoints is a single breakpoint.

13. The system of claim 11, further comprising testing software configured to execute the plurality of iterations of the software test on the software application without recompiling the source code with a respective modification for each iteration of the plurality of iterations.

14. The system of claim 10, wherein the one or more memory devices further include instructions that are executable by the one or more processors for causing the one or more processors to:
   generate a graphical user interface that includes a first graphical object through which the user can assign one or more override commands to one or more locations in the source code;
   detect a user interaction with a second graphical object of the graphical user interface; and
   in response to detecting the user interaction with the second graphical object:
      execute a syntax check on the one or more override commands to determine whether the one or more override commands are compatible with the debugging software; and
      in response to determining that the one or more override commands passed the syntax check, generate the override data to include the one or more locations and to include the one or more override commands assigned to the one or more locations.

15. The system of claim 14, wherein the graphical user interface is configured to display at least a portion of the source code in a color coding that indicates which of lines of the source code have override commands assigned thereto by the user.

16. The system of claim 14, wherein the one or more memory devices further include instructions that are executable by the one or more processors for causing the one or more processors to:
   identify a set of nested logical statements in the source code;
   determine a respective hierarchical level for each logical statement in the set of nested logical statements; and
   generate the graphical user interface to display the respective hierarchical level for each logical statement in the set of nested logical statements.

17. The system of claim 10, wherein the one or more memory devices further include instructions that are executable by the one or more processors for causing the one or more processors to:
   determine, by parsing the source code, a plurality of logical statements in the source code;
   determine, by parsing the source code, a plurality of functions in the source code;
   determine, by parsing the source code, a plurality of global variables in the source code; and
   generate the override data based on the plurality of logical statements, the plurality of functions, and the plurality of global variables.

18. The system of claim 10, wherein the target portion of the source code is different from another portion of the source code configured to be traversed during the software test absent the override command.

19. A non-transitory computer-readable medium comprising program code executable by a processor for causing the processor to:
   receive override data that is separate from and associated with source code for a software application, the override data including a location of a logical statement in the source code and the override data including an override command for execution upon reaching the location during a software test of the software application, the override command being configured to cause debugging software to modify an execution path of the software application during the software test from a first code pathway that excludes a target portion of the source code to a second code pathway that includes the target portion of the source code;
   generate debugging data based on the override data, the debugging data including a breakpoint associated with the location and the debugging data including a debugger command corresponding to the override command, the debugging data having a format that is different from the override data for compatibility with the debugging software;
   provide the debugging data as input to the debugging software, the debugging software being configured to monitor execution of the software application during the software test and responsively:
      determine that the breakpoint has been reached;
      in response to determining that the breakpoint has been reached, execute the debugger command for testing the target portion of the source code; and
      store, in a log, a test result from testing the target portion of the source code;
   execute a test coverage tool to generate coverage data indicating how much of the source code was tested by the software test;
   determine, based on the log, that an error occurred during the software test;
   generate a report that includes the coverage data and traceback information associated with the error; and
   output the report for display to a user.

20. The non-transitory computer-readable medium of claim 19, wherein the override data includes (i) one or more locations of one or more logical statements in the source code and (ii) a plurality of override commands for execution upon reaching the one or more locations during a plurality of iterations of the software test, wherein the debugging data includes one or more breakpoints associated with the one or more locations and a plurality of debugger commands corresponding to the plurality of override commands, and wherein the debugging software is configured to monitor the execution of the software application during the plurality of iterations of the software test and, for each iteration in the plurality of iterations of the software test:

extract a respective debugger command from among the plurality of debugger commands defined in the debugging data, wherein the respective debugger command corresponds to a particular breakpoint of the one or more breakpoints and is configured for testing a corresponding portion of the source code;

determine that the particular breakpoint has been reached;

in response to determining that the particular breakpoint has been reached, execute the respective debugger command for testing the corresponding portion of the source code; and store, in the log, a respective test result from testing the corresponding portion of the source code.

21. The non-transitory computer-readable medium of claim 20, wherein the one or more locations is a single line number corresponding to a single logical statement in the source code, the plurality of debugger commands correspond to the single line number and are configured for testing different corresponding portions of the source code, and the one or more breakpoints is a single breakpoint.

22. The non-transitory computer-readable medium of claim 20, further comprising testing software configured to execute the plurality of iterations of the software test on the software application without recompiling the source code with a respective modification for each iteration of the plurality of iterations.

23. The non-transitory computer-readable medium of claim 19, further comprising program code that is executable by the processor for causing the processor to:

generate a graphical user interface that includes a first graphical object through which the user can assign one or more override commands to one or more locations in the source code;

detect a user interaction with a second graphical object of the graphical user interface; and in response to detecting the user interaction with the second graphical object:

execute a syntax check on the one or more override commands to determine whether the one or more override commands are compatible with the debugging software; and in response to determining that the one or more override commands passed the syntax check, generate the override data to include the one or more locations and to include the one or more override commands assigned to the one or more locations.

24. The non-transitory computer-readable medium of claim 23, wherein the graphical user interface is configured to display at least a portion of the source code in a color coding that indicates which of lines of the source code have override commands assigned thereto by the user.

25. The non-transitory computer-readable medium of claim 23, further comprising program code that is executable by the processor for causing the processor to:

identify a set of nested logical statements in the source code;

determine a respective hierarchical level for each logical statement in the set of nested logical statements; and generate the graphical user interface to display the respective hierarchical level for each logical statement in the set of nested logical statements.

26. The non-transitory computer-readable medium of claim 19, further comprising program code that is executable by the processor for causing the processor to:

determine, by parsing the source code, a plurality of logical statements in the source code;

determine, by parsing the source code, a plurality of functions in the source code;

determine, by parsing the source code, a plurality of global variables in the source code; and generate the override data based on the plurality of logical statements, the plurality of functions, and the plurality of global variables.

27. The non-transitory computer-readable medium of claim 19, wherein the target portion of the source code is different from another portion of the source code configured to be traversed during the software test absent the override command.

\* \* \* \* \*